US008358392B2

(12) United States Patent
Suzuki et al.

(10) Patent No.: US 8,358,392 B2
(45) Date of Patent: Jan. 22, 2013

(54) LATERAL ELECTRIC FIELD TYPE ACTIVE-MATRIX ADDRESSING LIQUID CRYSTAL DISPLAY DEVICE

(75) Inventors: Teruaki Suzuki, Kanagawa (JP); Shinichi Nishida, Kanagawa (JP)

(73) Assignee: NLT Technologies, Ltd., Kanagawa (JP)

( * ) Notice: Subject to any disclaimer, the term of this patent is extended or adjusted under 35 U.S.C. 154(b) by 556 days.

(21) Appl. No.: 12/249,465

(22) Filed: Oct. 10, 2008

(65) Prior Publication Data
US 2009/0103035 A1 Apr. 23, 2009

(30) Foreign Application Priority Data

Oct. 23, 2007 (JP) ................................. 2007-275702

(51) Int. Cl.
G02F 1/1333 (2006.01)
G02F 1/1343 (2006.01)
(52) U.S. Cl. ......... 349/141; 349/110; 349/139; 349/143
(58) Field of Classification Search .................. 349/110, 349/139, 141, 143
See application file for complete search history.

(56) References Cited

U.S. PATENT DOCUMENTS
3,807,831 A 4/1974 Soref 6,744,482 B2 * 6/2004 Matsumoto et al. .......... 349/141

FOREIGN PATENT DOCUMENTS
| JP | 56-91277 | 7/1981 |
| JP | 07-036058 | 2/1995 |
| JP | 2001-222030 | 8/2001 |
| JP | 2005-195927 | 7/2005 |

* cited by examiner

*Primary Examiner* — Uyen Chau N Le
*Assistant Examiner* — Michael Mooney
(74) *Attorney, Agent, or Firm* — Young & Thompson

(57) ABSTRACT

A lateral electric field type active-matrix addressing liquid crystal display device suppresses the lateral cross talk induced by the coupling capacitances (i.e., the parasitic capacitances) between the drain bus lines and the common bus line corresponding thereto with a simple structure. In each of the pixel electrodes, at least one electrically isolated light-shielding electrode is formed to extend along the drain bus lines that define the pixel electrode near the same drain bus lines. The light-shielding electrode is overlapped with a part of a corresponding one of the pixel electrodes to the pixel region in such a way that an insulating film intervenes between the light-shielding electrode and the part, the part extending along these drain bus lines in the vicinities thereof. The light-shielding electrode may be electrically connected to the corresponding one of the pixel electrodes at a point in the pixel region.

8 Claims, 10 Drawing Sheets

LATERAL ELECTRIC FIELD TYPE ACTIVE-MATRIX ADDRESSING LIQUID CRYSTAL DISPLAY DEVICE

BACKGROUND OF THE INVENTION

1. Field of the Invention

The present invention relates to a Liquid crystal Display (LCD) device and more particularly, to an active-matrix addressing LCD device of the lateral electric field type, such as the In-Plane Switching (IPS) type.

2. Description of the Related Art

Generally, the LCD device has features, such as low profile, reduced weight, and low power consumption. In particular, the active-matrix addressing LCD device that drives the respective pixels arranged in a matrix array by the active elements has ever been recognized as a high image quality flat-panel display device. Especially, the active-matrix addressing LCD device using thin-film transistors (TFTs) as the active elements for switching the respective pixels has been extensively diffused.

Most of active-matrix addressing LCD devices, which utilizes the electrooptic effects of the TN (Twisted Nematic) type liquid crystal material sandwiched by two substrates, display images by the application of an electric field approximately vertical to the main surfaces of the substrates across the liquid crystal material to thereby cause displacement of the liquid crystal molecules. These LCD devices are termed the "vertical electric field" type. On the other hand, some of the active-matrix addressing LCD devices display images by the application of an electric field approximately parallel to the main surfaces of the substrates across the liquid crystal material to thereby cause displacement of the liquid crystal molecules in the planes parallel to the main surfaces. These LCD devices have been known also, which are termed the "lateral electric field" type. Various improvements have ever been made not only for the vertical electric field type LCD devices but also for the lateral electric field type ones. Some of the improvements made for the latter will be exemplified below.

A structure using comb-tooth-like electrodes mated with each other in the lateral electric field type LCD device is disclosed in the Patent Document 1 (i.e., U.S. Pat. No. 3,807,831) issued in 1974 (see claim 1, FIGS. 1 to 4 and FIG. 11).

A technique using comb-tooth-like electrodes mated with each other similar to those in the Patent Document 1 in the active-matrix addressing LCD device utilizing the electrooptic effects of the TN type liquid crystal material is disclosed in the Patent Document 2 (i.e., Japanese Unexamined Patent Publication No. 56-091277) published in 1981 (see claim 2, FIG. 7 and FIGS. 9 to 13). This technique reduces the parasitic capacitance between the common electrode(s) and the drain bus lines, or that between the common electrode(s) and the gate bus lines.

A technique that realizes a lateral electric field type LCD device without using the comb-tooth-like electrodes in the active-matrix addressing LCD device using TFTs is disclosed in the Patent Document 3 (i.e., Japanese Unexamined Patent Publication No. 7-036058) published in 1995 (see claims 1 and 5, FIGS. 1 to 23). With this technique, the common electrode(s) and the image signal electrodes or the common electrode(s) and the liquid crystal driving electrodes are formed on different layers in such a way that an insulating film intervenes between them, and at the same time, the common electrode(s) or the liquid crystal driving electrodes is/are formed to be ring-, cross-, T-, ?-, H-, or ladder-shaped.

A technique that the comb-tooth-like electrodes for driving the liquid crystal material (i.e., the pixel electrodes and the common electrode(s)) are formed by a transparent conductive material or materials in such a way as to be placed on an upper layer than the drain bus lines (or the data bus lines), in other words, to be placed nearer to the liquid crystal layer than the drain or data bus Lines, is disclosed in the Patent Document 4 (i.e. , Japanese Unexamined Patent Publication No. 2001-222030) published in 2001 (see abstract and FIGS. 3 to 5).

FIG. 1 is a partial plan view showing an example of the structure of the first substrate (i.e., the active-matrix substrate) used in the related-art lateral electric field type LCD device disclosed in the Patent Document 4. FIG. 2 is a cross-sectional view of the LCD device along the line II-II in FIG. 1. These two figures show the structure of one of the pixel regions.

The first substrate 111 of the related-art LCD device shown in FIGS. 1 and 2 comprises gate bus lines 155 that are extended along the lateral (horizontal) direction of FIG. 1 and arranged at equal intervals along the longitudinal (vertical) direction of the same figure, and drain bus lines 156 that are extended along the longitudinal direction of FIG. I and arranged at equal intervals along the lateral direction of the same figure. A pixel region P is formed in each of the approximately rectangular areas defined by the gate bus lines 155 and the drain bus lines 156. These pixel regions P (i.e., the pixels) are arranged in a matrix array as a whole.

Further, the first substrate 111 of this related-art LCD device comprises common bus lines 152, each of which is extended in parallel to a corresponding one of the gate bus lines 155. These common bus lines 152 are provided for electrical interconnection among the common electrodes 172 formed in the respective pixel regions P. Each of the common bus lines 152 is located near the upper end of each pixel region P and is apart from a corresponding one of the gate bus lines 155 at a predetermined distance. The gate bus lines 155, the drain bus lines 156, and the common bus lines 152 are made of opaque metallic materials, respectively.

In each of the pixel regions P, the corresponding common bus line 152 comprises two belt-shaped light-shielding parts 152a that extend respectively along the two drain bus lines 156 that define the pixel region P. These two light-shielding parts 152a are united with the common bus line 152. The light-shielding part 152a positioned at the left side of the pixel region P is adjacent to the right edge of the drain bus line 156 placed at the left side of the pixel region P. The light-shielding part 152a positioned at the right side of the pixel region P is adjacent to the left edge of the drain bus line 156 placed at the right side of the pixel region P. These two light-shielding parts 152a have the same plan shape or pattern.

For each of the pixel regions P, a TFT 145 is formed near the intersection of the corresponding gate bus line 155 and the corresponding drain bus line 156. The TFT 145 is formed by a gate electrode (not shown) united with the corresponding gate bus line 155; an island-shaped semiconductor film 143 overlapped with the gate electrode in such a way that a gate insulating film 157 intervenes between them; a drain electrode 156a united with the corresponding drain bus line 156 and overlapped with the semiconductor film 143; and a source electrode 142 formed to be opposite to the drain electrode 156a at a predetermined distance and overlapped with the semiconductor film 143. The gate electrode, the drain electrode 156a, and the source electrode 142 are made of opaque metallic materials, respectively.

In each of the pixel regions P, a pixel electrode 171 and a common electrode 172 for generating liquid crystal driving electric field are formed. The pixel electrode 171 and the common electrode 172, each of which is made of a transparent conductive material, have comb-tooth-like plan shapes.

The pixel electrode 171 comprises a belt-shaped base 171b placed on the side of the TFT 145 (i.e., the TFT side) in the pixel region P, and four comb-tooth-like parts 171a protruding from the base 171b toward the opposite side to the TFT 145 (toward the upper side in FIG. 1) in the pixel region P. The four comb-tooth-like parts 171a are extended in parallel to the drain bus lines 156 and are arranged along the base 171b (along the lateral direction in FIG. 1) at equal intervals. The top ends of the respective comb-tooth-like parts 171a are located near the corresponding common bus line 152. Two of the comb-tooth-like parts 171a placed at outer positions are respectively overlapped with the corresponding light-shielding parts 152a existing near the two drain bus lines 156 that define the pixel region P. The pixel electrode 171 is electrically connected to the source electrode 142 of the corresponding TFT 145 at the base 171b by way of a corresponding one of contact holes 161.

The common electrode 172 comprises a belt-shaped base 172b placed on the opposite side of the TFT 145 in the pixel region P, and three comb-tooth-like parts 172a protruding from the base 172b toward the side of the TFT 145 (toward the lower side in FIG. 1) in the pixel region P. The three comb-tooth-like parts 172a are extended in parallel to the drain bus lines 156 and are arranged along the base 172b (along the lateral direction in FIG. 1) at equal intervals. The top ends of the respective comb-tooth-like parts 172a are located near the base 171b of the pixel electrode 171. The three comb-tooth-like parts 172a and the four comb-tooth-like parts 171a are arranged alternately along the gate and common bus lines 155 and 152. Therefore, it may be said that these comb-tooth-like parts 172a and 171a are mated with each other. The common electrode 172 is electrically connected to the corresponding common bus line 152 at the base 172b by way of a corresponding one of contact holes 162.

As shown in FIG. 2, this related-art LCD device comprises the first substrate (i.e., the active-matrix substrate) 111 having the structure of FIG. 1, a second substrate (i.e., an opposite substrate) 112 opposed to the first substrate 111 at a predetermined gap, and a liquid crystal layer 120 placed between the substrates 111 and 112.

The gate bus lines 155, the common bus lines 152, the light-shielding parts 152a, and the gate electrodes of the TFTs 145 are formed on the surface of the glass plate 111a of the first substrate 111. The gate insulating film 157 is formed on the surface of the glass plate 111a to cover the gate bus lines 155, the common bus lines 152, the light-shielding parts 152a, and the gate electrodes. (Only the light-shielding parts 152a are shown in FIG. 2.) Each of the gate electrodes is united with a corresponding one of the gate bus lines 155. The drain bus lines 156, the semiconductor films 143 of the TFTs 145, the drain electrodes 156a, and the source electrodes 142 are formed on the gate insulating film 157. A protective insulating film 159 is formed on the gate insulating film 157 to cover the drain bus lines 156, the semiconductor films 143, the drain electrodes 156a, and the source electrodes 142. (Only the drain bus lines 156 are shown in FIG. 2.) The pixel electrodes 171 and the common electrodes 172 are formed on the protective insulating film 159. (Only the comb-tooth-like parts 171a of the pixel electrode 171 and the comb-tooth-like parts 172a of the common electrode 172 are shown in FIG. 2.)

As explained above, the common bus lines 152 are located on the surface of the glass plate 111a and the drain bus lines 156 are located on the gate insulating film 157. Therefore, the common bus lines 152 are placed on a lower layer than the drain bus lines 156, in other words, on a further layer from the liquid crystal layer 120 than the drain bus lines 156. Similarly, since the gate bus lines 155 are located on the surface of the glass plate 111a, the gate bus lines 155 also are placed on a lower layer than the drain bus lines 156, in other words, on a further layer from the liquid crystal layer 120 than the drain bus lines 156. Because the pixel electrodes 171 and the common electrodes 172 are formed on the protective insulating film 159, the pixel and common electrodes 171 and 172 are placed on an upper layer than the drain bus lines 156, in other words, on a nearer layer to the liquid crystal layer 120 than the drain bus lines 156.

On the surface (i.e., the inner face) of the first substrate 111 having the above-described structure, in other words, on the protective insulating film 159, an alignment film 131 made of an organic polymer is formed. Therefore, the pixel electrodes 171 and the common electrodes 172 are covered with the alignment film 131. The surface of the alignment film 131 is subjected to a predetermined aligning treatment.

On the other hand, a color layer 182 including the three primary colors of red (R), green (G) and blue (B) is formed on the surface of the glass plate 112a of the second substrate 112 corresponding to the respective pixel regions P. A light-shielding black matrix layer 181 is formed on the surface of the glass plate 112a in the remaining region excluding the regions corresponding to the pixel regions P. The color layer 182 is formed by a red color sublayer 182R, a green color sublayer 182G, and a blue color sublayer 182B, each of which has been patterned to have a predetermined shape. The plan shape or pattern of the black matrix 181 is determined in such a way as to cover the structural elements formed on the first substrate 111 by opaque metallic materials (i.e., the gate bus lines 155, the drain bus lines 156, the common bus lines 152, the light-shielding parts 152a, and the TFTs 145) and to define rectangular openings (i.e., light transmission areas) in the respective pixel regions P. The color layer 182 is selectively placed in these openings or light transmission areas.

The color layer 182 and the black matrix layer 181 are covered with an overcoat film 185. The overcoat film 185, which is formed to cover the whole surface of the glass plate 112a, is provided to protect the color layer 182 and the black matrix layer 181 and to planarize the level differences generated by the color layer 182 and the black matrix layer 181. Columnar spacers (not shown) are formed on the black matrix layer 181 to keep the gap between the first and second substrates 111 and 112.

On the surface (i.e., the inner face) of the second substrate 112 having the above-described structure, in other words, on the overcoat film 185, an alignment film 132 made of an organic polymer is formed. Therefore, the columnar spacers are covered with the alignment film 132. The surface of the alignment film 132 is subjected to a predetermined aligning treatment.

The first substrate (i.e., the active-matrix substrate) 111 and the second substrate (i.e., the opposite substrate) 112 are superposed on each other at a predetermined gap in such a way that their surfaces on which the alignment films 131 and 132 are respectively formed are directed inward and opposed to each other. A liquid crystal material is confined in the space between the substrates 111 and 112, forming the liquid crystal layer 120. In other words, the liquid crystal layer 120 is sandwiched and held by the substrates 111 and 112. A pair of polarizer plates (not shown) is arranged on the outer surfaces of the first and second substrates 111 and 112 (i.e., the backs of the glass plates 111a and 112a), respectively.

Because the surfaces of the alignment films 131 and 132 have been subjected to the predetermined aligning treatments, the liquid crystal molecules 121 existing in the liquid crystal layer 120 are aligned in parallel along a predetermined direction shifted at a fixed angle (e.g., approximately 15° clockwise) from the vertical or longitudinal direction of FIG. 1 when no electric field is applied, as shown by the arrow in FIG. 1. This means that the initial alignment direction of the liquid crystal molecules 121 is defined at the direction indicated by the arrow in FIG. 1. Moreover, the transmission axes of the pair of polarizer plates are crossed at right angles. The transmission axis of one of the pair of polarizer plates is in accordance with the alignment direction of the liquid crystal molecules 121 when no electric field is applied (i.e., the initial alignment direction).

Next, a method of fabricating the related-art LCD device shown in FIGS. 1 and 2 will be explained below.

The first substrate 111 is fabricated in the following way.

First, a chromium (Cr) film is formed on the whole surface of the glass plate 111a and patterned to have a predetermined shape, thereby forming the gate bus lines 155, the common bus lines 152, and the light-shielding parts 152a on the surface of the glass plate 111a. At this time, the gate electrodes also are formed in such a way as to be united with the corresponding gate bus lines 155. Next, the gate insulating film 157, which is made of silicon nitride ($SiN_x$), is formed on the whole surface of the glass plate 111a to cover the gate electrodes, the gate bus lines 155, the common bus lines 152, and the light-shielding parts 152a.

Subsequently, an amorphous silicon (a-Si) film is formed on the gate insulating film 157 and patterned to result in island-like parts, thereby forming the island-shaped semiconductor films 143 for the TFTs 145. Each of the island-shaped semiconductor films 143 is overlapped with a corresponding one of the gate bus lines 155 in such a way that the gate insulating film 157 intervenes between them. Moreover, a Cr film is formed on the gate insulating film 157 and patterned, thereby forming the drain bus lines 156, the drain electrodes 156a, and the source electrodes 142 on the gate insulating film 157. Thereafter, the protective insulating film 159, which is made of $SiN_x$, is formed on the whole surface of the glass plate 111a, covering the drain bus lines 156, the drain electrodes 156a, and the source electrodes 142.

Following this, the protective insulating film 159 is selectively removed at the predetermined positions superposed on the respective source electrodes 142, thereby forming the contact holes 161 that reach the corresponding source electrodes 142. Moreover, the protective insulating film 159 and the gate insulating film 157 are selectively removed at the predetermined positions superposed on the respective common bus lines 152, thereby forming the contact holes 162 that reach the corresponding common bus lines 152.

Thereafter, a transparent conductive film, which is made of ITO (Indium Tin Oxide) or the like, is formed on the protective insulating film 159 and patterned to have a predetermined shape, thereby forming the pixel electrodes 171 each having the comb-tooth-like parts 171a and the common electrodes 172 each having the comb-tooth-like parts 172a on the protective insulating film 159. At this time, the pixel electrodes 171 are electrically connected to the corresponding source electrodes 142 by way of the corresponding contact holes 161. The common electrodes 172 are electrically connected to the corresponding common bus lines 152 by way of the corresponding contact holes 162. In this way, the first substrate 111 is fabricated.

The second substrate 112 is fabricated in the following way.

First, the black matrix layer 181 and the color layer 182 each having the predetermined shape or pattern are formed on the surface of the glass plate 112a. When the color layer 182 is formed, the red color sublayer 182R, the green color sublayer 182G, and the blue color sublayer 182B each having a predetermined shape may be successively formed on the surface of the glass plate 112a in an appropriate order. Next, the overcoat film 185 is formed on the whole surface of the glass plate 112a, thereby covering the black matrix layer 181 and the color layer 182. Thereafter, the columnar spacers (not shown) are formed on the overcoat film 185. In this way, the second substrate 112 is fabricated.

Following this, the alignment films 131 and 132, which are made of polyimide, are respectively formed on the surface of the first substrate 111 and the surface of the second substrate 112 fabricated in the above-described manners. The surfaces of the alignment films 131 and 132 are uniformly subjected to the predetermined aligning treatment.

Thereafter, the first and second substrates 111 and 112 are superposed on each other to have a predetermined gap such as 4.0 μm. Next, in a vacuum chamber (not shown), a predetermined nematic liquid crystal material whose refractive index anisotropy is, for example, 0.075 is injected into the space between the substrates 111 and 112 and then, the space is sealed. After the sealing operation of the space is completed, the polarizer plates (not shown) are respectively adhered onto the outer surfaces of the substrates 111 and 112. As a result, the LCD panel is completed.

A predetermined driver LSI (Large-Scale Integrated Circuit) and a predetermined backlight unit are mounted on the LCD panel thus fabricated. As a result, the related-art LCD device having the structure shown in FIGS. 1 and 2 is completed.

With the related-art lateral electric field type LCD device shown in FIGS. 1 and 2, the liquid crystal driving electric field is uniformly generated along the approximately lateral (horizontal) direction of FIG. 1 when a voltage is applied. For this reason, the liquid crystal molecules 121 aligned along the initial alignment direction (i.e., the direction indicated by the arrow in FIG. 1) when no electric field is applied are rotated clockwise by the liquid crystal driving electric field, and as a result, the alignment state of the liquid crystal molecules 121 is changed. Since the transmittance in the respective pixel regions P (i.e., the respective pixels) is modulated by such the alignment state change of the liquid crystal molecules 121, images can be displayed as desired.

Moreover, with the related-art lateral electric field type LCD device shown in FIGS. 1 and 2, both of the pixel electrodes 171 and the common electrodes 172 for generating the liquid crystal driving electric field are made of a transparent conductive material and therefore, light penetrates through the regions where the pixel and common electrodes 171 and 172 are present. For this reason, the aperture ratio and the transmittance are improved compared with the case where the pixel electrodes 171 and the common electrodes 172 are made of an opaque metal or metals.

In addition, since the amount of the opaque metallic parts existing in the openings of the black matrix layer 181 is reduced in the above-described manner, the scattering of light caused by the edges of the opaque metallic parts and the alignment distortion of the liquid crystal molecules 121 caused by the level differences in the vicinities of the same edges are suppressed. The scattering of light and the alignment distortion of the liquid crystal molecules 121 will be a cause of optical leakage when black is displayed. However, with this related-art lateral electric field type LCD device, the scattering of light and the alignment distortion of the liquid crystal molecules 121 are suppressed and therefore, the display contrast is improved.

If the opaque metallic parts are present in the openings of the black matrix layer 181, the incident light will be reflected by these opaque metallic parts when this related-art LCD device is used in a comparatively well-lighted place, and as a result, the "light place contrast" is likely to deteriorate conspicuously. However, this related-art LCD device does not include such the opaque metallic parts in the openings of the black matrix layer 181. Accordingly, with this related-art LCD device, the light place contrast is prevented from deteriorating.

Furthermore, the two light-shielding parts 152a, which are united with the corresponding common bus line 152 in the pixel region P as shown in FIG. 1, are respectively provided in the vicinities of the two drain bus lines 156 that define the pixel region P. The areas between the light-shielding parts 152a and the corresponding drain bus lines 156 adjacent thereto are covered with the black matrix layer 181. Therefore, the leakage of light induced by the leaked electric field from the respective drain bus lines 156 and the vertical cross talk are restrained.

With the related-art LCD device shown in FIGS. 1 and 2, the above-described advantages are obtained. However, the two light-shielding parts 152a united with the corresponding common bus line 152 are respectively extended along the two drain bus lines 156 that define the pixel region P over a long distance in the vicinities of these drain bus lines 156. Therefore, the coupling capacitances (i.e., the parasitic capacitances) between these two drain bus lines 156 and the corresponding common bus line 152 (i.e., the corresponding common electrode 172) will be large.

For this reason, the effect of electric potential fluctuation (i.e., the effect of signal voltage change) on the drain bus lines 156 is likely to be transferred to the corresponding common electrode 172 by way of the corresponding common bus line 152. In other words, the electric potential (which should be kept constant originally) of the common electrode 172 electrically connected to the corresponding common bus line 152 tends to fluctuate due to the electric potential fluctuation on the corresponding drain bus lines 156. As a result, a problem that lateral cross talk is likely to occur arises.

SUMMARY OF THE INVENTION

The present invention was created to solve the above-described problem.

An object of the present invention is to provide a lateral electric field type active-matrix addressing LCD device that suppresses the lateral cross talk induced by the coupling capacitances (i.e., the parasitic capacitances) between the drain bus lines and the common bus line corresponding thereto with a simple structure.

Another object of the present invention is to provide a lateral electric field type active-matrix addressing LCD device having improved image quality compared with the above-described related-art LCD device shown in FIGS. 1 and 2.

The above objects together with others not specifically mentioned will become clear to those skilled in the art from the following description and the figures attached.

According to the first aspect of the present invention, a lateral electric field type active-matrix addressing LCD device is provided, which comprises:

a first substrate including gate bus lines, common bus lines parallel to the gate bus lines, and drain bus lines intersected with the gate bus lines and the common bus lines;

a second substrate held to be opposite to the first substrate at a predetermined gap;

a liquid crystal layer placed between the first substrate and the second substrate;

pixel regions defined by the gate bus lines and the drain bus lines to be arranged in a matrix array; and each of the pixel regions including a switching element, a pixel electrode electrically connected to the switching element, and a common electrode electrically connected a corresponding one of the common bus lines;

wherein in each of the pixel regions, at least one light-shielding electrode is formed to extend along the drain bus lines that define the pixel electrode near the same drain bus lines;

the at least one light-shielding electrode is electrically isolated and is overlapped with at least one part of the pixel electrode corresponding to the pixel region in such a way that an insulating film intervenes between the at least one light-shielding electrode and the at least one part, wherein the at least one part is extended along the drain bus lines in their vicinities; and liquid crystal molecules confined in the liquid crystal layer are rotated in planes approximately parallel to the first substrate, thereby displaying images.

With the lateral electric field type active-matrix addressing LCD device according to the first aspect of the present invention, in each of the pixel regions, the at least one light-shielding electrode is formed to extend along the drain bus lines that define the pixel electrode near the same drain bus lines. The at least one light-shielding electrode is electrically isolated and is overlapped with the at least one part of the corresponding pixel electrode to the pixel region in such a way that the insulating film intervenes between the at least one light-shielding electrode and the at least one part, wherein the at least one part is extended along the drain bus lines in their vicinities.

Therefore, in the operating state, the electric potential of the at least one light-shielding electrode will be close to that of the corresponding pixel electrode (which is equivalent to the signal voltage). For this reason, the electric potential difference(s) between the drain bus lines and the at least one light-shielding electrode corresponding thereto is/are very small, in other words, the coupling capacitances (i.e., the parasitic capacitances) between the drain bus lines and the at least one light-shielding electrode are very small.

On the other hand, with the related-art LCD device shown in FIGS. 1 and 2, the light-shielding parts 152a are united with the corresponding common bus line 152 and therefore, the electric potential of the light-shielding parts 152a will be equal to that of the corresponding common electrode 172. Accordingly, the electric potential differences between the drain bus lines 156 and the common bus line 152 corresponding thereto will be equal to the differences between the electric potentials equivalent to the signal voltages supplied to the drain bus lines 156 and the electric potential of the common electrode 172. This means that the coupling capacitances (i.e., the parasitic capacitances) between the drain bus lines 156 and the light-shielding parts 152a corresponding thereto will be considerably large.

In this way, with the LCD device according to the first aspect of the invention, the coupling or parasitic capacitances between the drain bus lines and the at least one light-shielding electrode are considerably smaller than those between the drain bus lines 156 and the corresponding common bus line 152 (i.e., the corresponding light-shielding parts 152a) of the related-art LCD device and therefore, the lateral cross talk is suppressed. Moreover, because of the suppression of the lateral cross talk, the image quality is improved.

According to the second aspect of the present invention, another lateral electric field type active-matrix addressing LCD device is provided, which comprises:

a first substrate including gate bus lines, common bus lines parallel to the gate bus lines, and drain bus lines intersected with the gate bus lines and the common bus lines;

a second substrate held to be opposite to the first substrate at a predetermined gap;

a liquid crystal layer placed between the first substrate and the second substrate;

pixel regions defined by the gate bus lines and the drain bus lines to be arranged in a matrix array; and each of the pixel regions including a switching element, a pixel electrode electrically connected to the switching element, and a common electrode electrically connected a corresponding one of the common bus lines;

wherein in each of the pixel regions, at least one light-shielding electrode is formed to extend along the drain bus lines that define the pixel electrode near the same drain bus lines;

the at least one light-shielding electrode is overlapped with at least one part of the pixel electrode corresponding to the pixel region in such a way that an insulating film intervenes between the at least one light-shielding electrode and the at least one part, wherein the at least one part is extended along the drain bus lines in their vicinities;

the at least one light-shielding electrode is electrically connected to the pixel electrode corresponding to the pixel region at a position in the pixel region; and liquid crystal molecules confined in the liquid crystal layer are rotated in planes approximately parallel to the first substrate, thereby displaying images.

With the lateral electric field type active-matrix addressing LCD device according to the second aspect of the present invention, the at least one light-shielding electrode is not electrically isolated but electrically connected to the pixel electrode corresponding to the pixel region at a position in the pixel region, which is different from the LCD device according to the first aspect of the invention. The other structure of the device of the second aspect is the same as that of the first aspect.

In this way, the at least one light-shielding electrode is electrically connected to the corresponding pixel electrode at a position in the pixel region and therefore, the electric potential of the at least one light-shielding electrode will be equal to that of the corresponding pixel electrode in the operating state. On the other hand, as explained for the LCD device according to the first aspect of the invention, the electric potential of the electrically floating light-shielding electrode will be close to that of the corresponding pixel electrode in the operating state. Thus, the at least one light-shielding electrode of the LCD device of the second aspect has an approximately the same function as that of the at least one light-shielding electrode of the LCD device of the first aspect.

Accordingly, with the LCD device of the second aspect also, the coupling or parasitic capacitances between the drain bus lines and the at least one light-shielding electrode are considerably smaller than those between the drain bus line 156 and the corresponding common bus line 152 (i.e., the corresponding light-shielding parts 152a) of the related-art LCD device shown in FIGS. 1 and 2, and as a result, the lateral cross talk is suppressed. Moreover, because of the suppression of the lateral cross talk, the image quality is improved.

In a preferred embodiment of the devices according to the first and second aspects of the invention, the at least one light-shielding electrode is placed on a different layer from that for the drain bus lines in such a way that an insulating film intervenes between them. In this embodiment, it is preferred that the at least one light-shielding electrode is placed on a further layer from the liquid crystal layer than the drain bus lines, or on a same layer as that of the gate bus lines.

In another preferred embodiment of the devices according to the first and second aspects of the invention, the at least one part of the pixel electrode corresponding to the pixel region is comb-tooth-shaped, and the at least one light-shielding electrode is belt-shaped to extend along the drain bus lines.

In still another preferred embodiment of the devices according to the first and second aspects of the invention, the pixel electrode corresponding to the pixel region comprises comb-tooth-shaped parts extending along the drain bus lines;

two of the comb-tooth-shaped parts of the pixel electrode located at outer positions are used as the at least one part of the pixel electrode extending along the two drain bus lines that define the pixel electrode in the vicinities of the same drain bus lines; and the two light-shielding electrodes are belt-shaped to extend along the two drain bus lines that define the pixel electrode, respectively.

In a further preferred embodiment of the devices according to the first and second aspects of the invention, the drain bus lines are bent to have approximately V-like shapes in accordance with the respective pixel regions, and the pixel electrodes and the common electrodes are bent to have approximately V-like shapes corresponding to the drain bus lines.

In a still further preferred embodiment of the devices according to the first and second aspects of the invention, the pixel electrodes are placed on a different layer from that for the drain bus lines in such a way that an insulating film intervenes between them. In this embodiment, it is preferred that the pixel electrodes are placed on a nearer layer to the liquid crystal layer than the drain bus lines.

In a still further preferred embodiment of the devices according to the first and second aspects of the invention, the common electrodes are placed on a same layer as the pixel electrodes.

In a still further preferred embodiment of the devices according to the first and second aspects of the invention, the pixel electrodes and/or the common electrodes are made of a transparent conductive material or materials.

BRIEF DESCRIPTION OF THE DRAWINGS

In order that the present invention may be readily carried into effect, it will now be described with reference to the accompanying drawings.

DETAILED DESCRIPTION OF THE PREFERRED EMBODIMENTS

Figure 1:
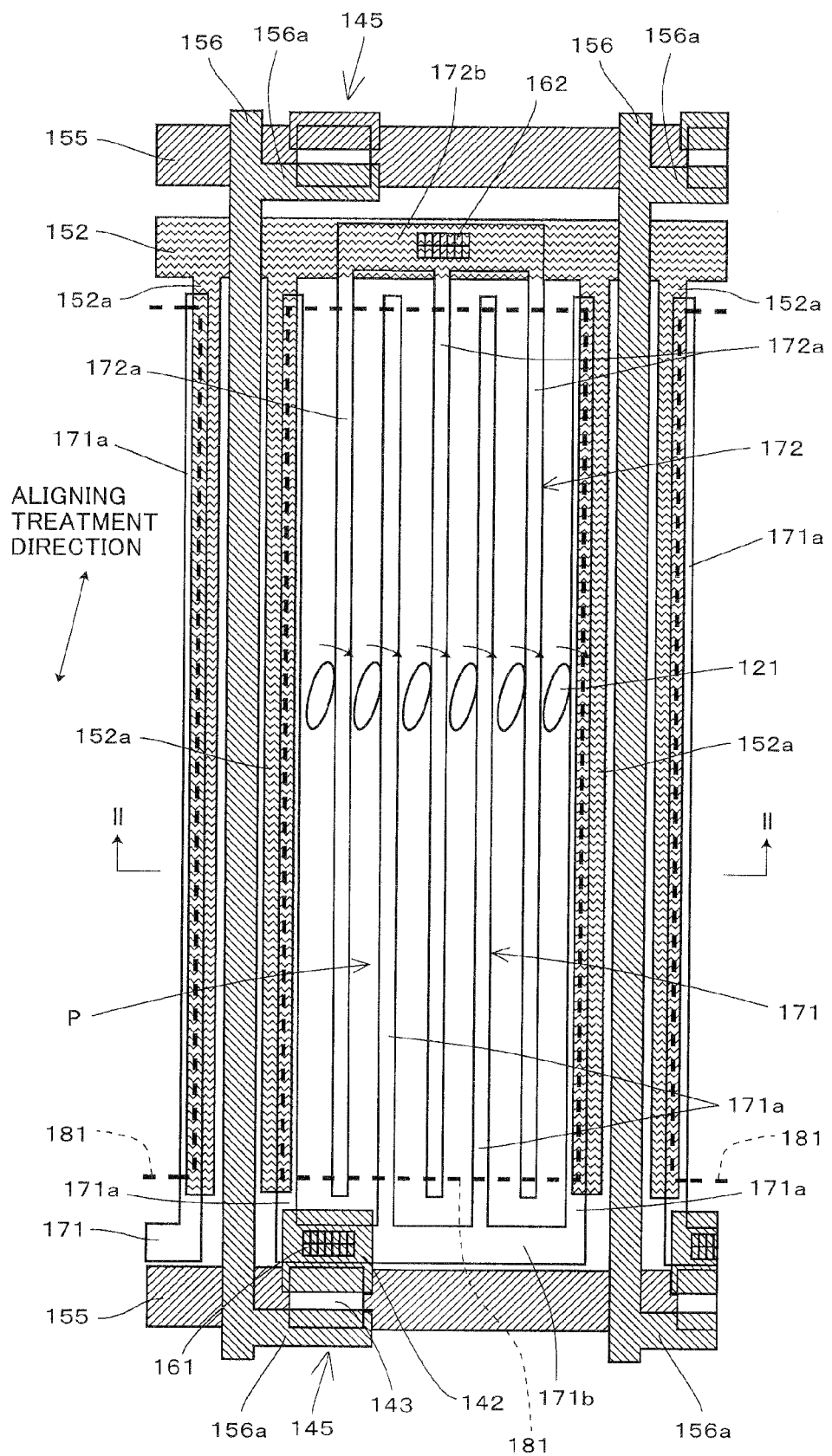
FIG. 1 is a partial plan view showing an example of the structure of the first substrate (i.e., the active-matrix substrate) used in a related-art lateral electric field type active-matrix addressing LCD device.

Preferred embodiments of the present invention will be described in detail below while referring to the drawings attached.

Structure of First Embodiment

Figure 3:
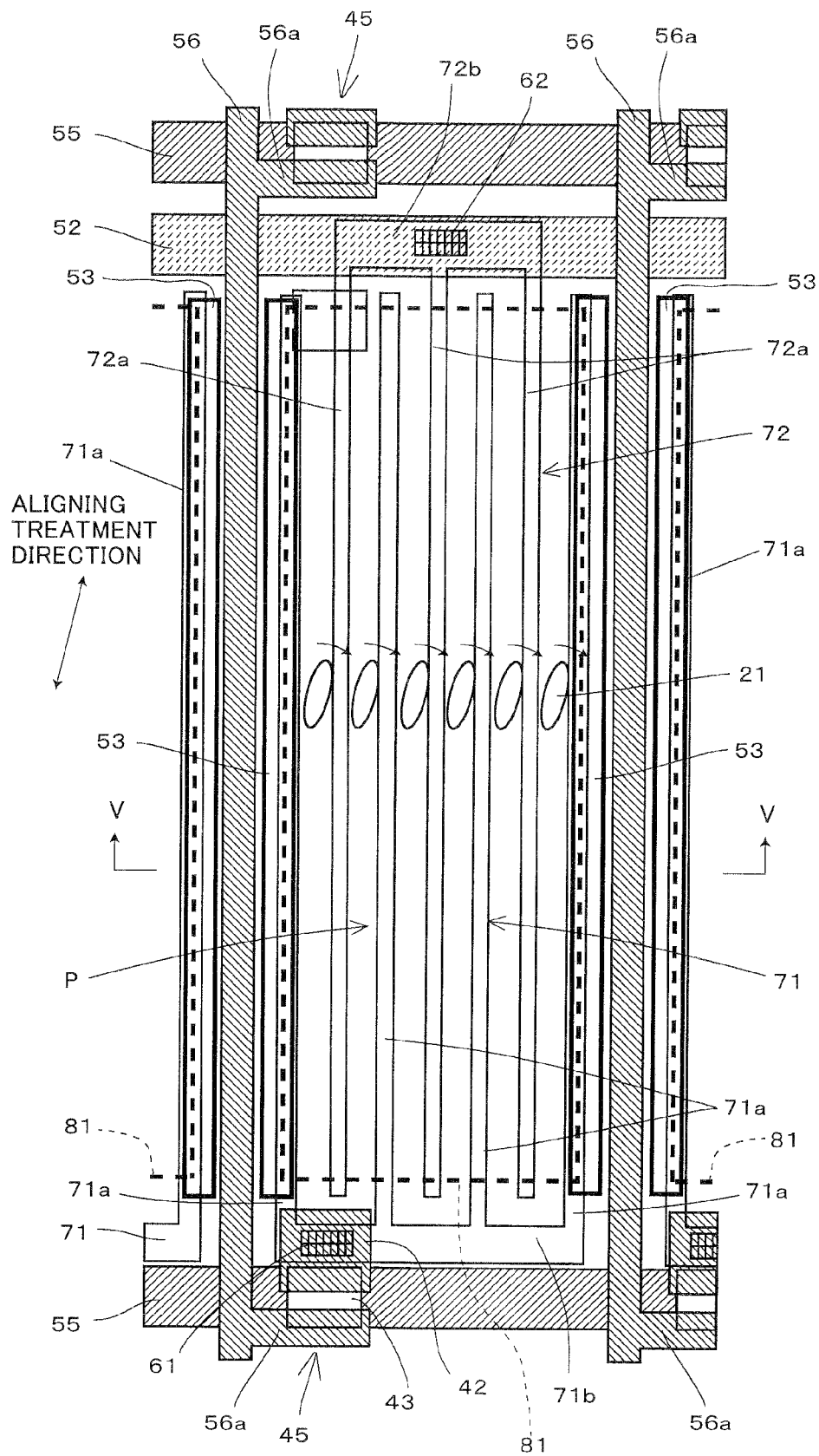
FIG. 3 is a partial plan view showing the structure of the active-matrix substrate used in a lateral electric field type active-matrix addressing LCD device according to a first exemplary embodiment of the present invention.
Figure 4:
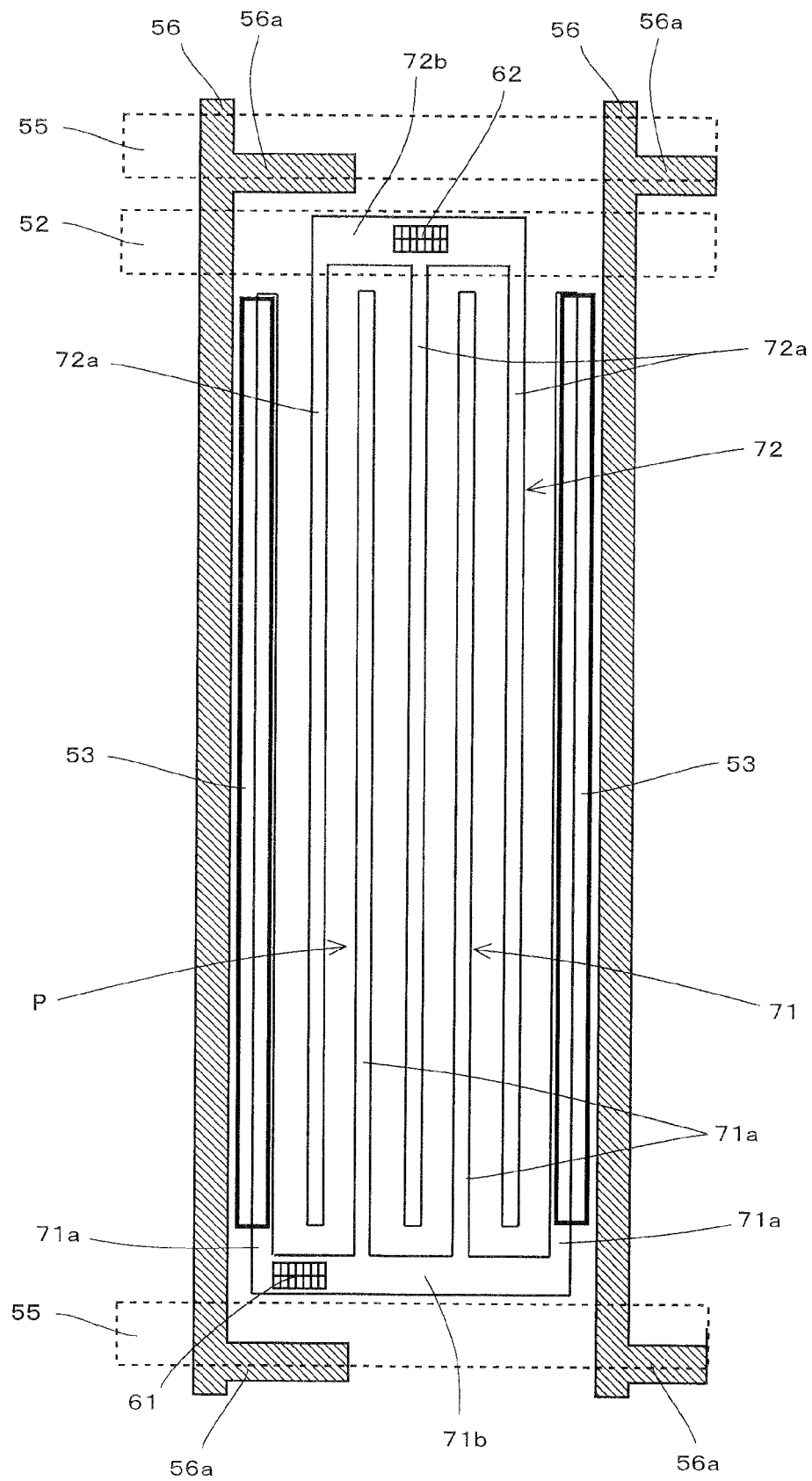
FIG. 4 is an explanatory partial plan view showing the plan shapes of the pixel electrode and the common electrode used in the active-matrix substrate shown in FIG. 3.
Figure 5:
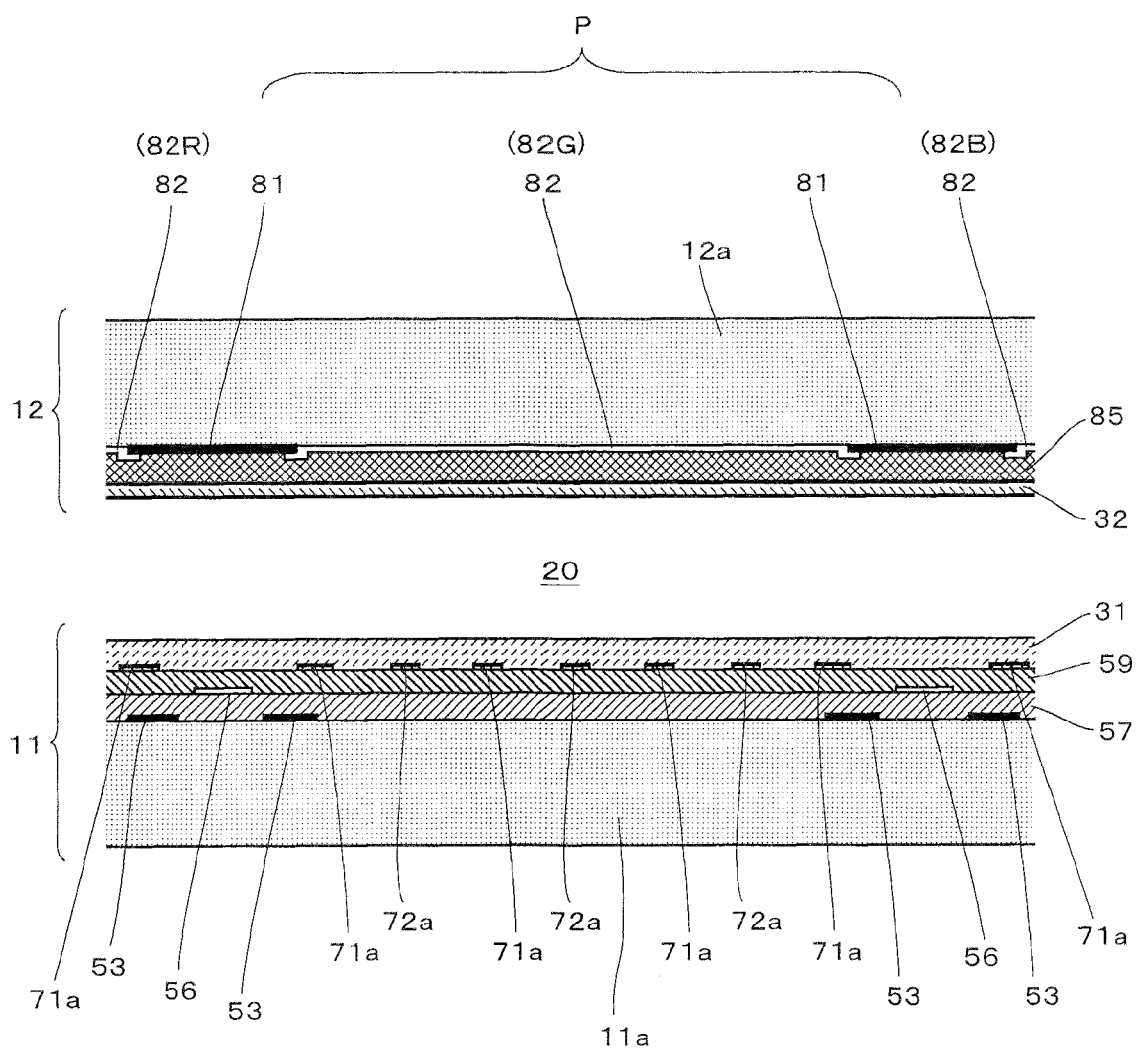
FIG. 5 is a partial cross-sectional view along the line V-V in FIG. 3.

FIGS. 3 to 5 show the structure of a lateral electric field (IPS) type active-matrix addressing LCD device according to a first exemplary embodiment of the present invention. These figures show the structure of one of the pixel regions.

The first substrate (i.e., the active-matrix substrate) 11 of the LCD device according to the first embodiment comprises gate bus lines 55 that are extended along the lateral (horizontal) direction of FIG. 3 and arranged at equal intervals along the longitudinal (vertical) direction thereof, and drain bus lines 56 that are extended along the longitudinal direction of FIG. 3 and arranged at equal intervals along the lateral direction thereof. A pixel region P is formed in each of the approximately rectangular regions defined by the gate bus lines 55 and the drain bus lines 56. These pixel regions P (i.e., the pixels) are arranged in a matrix array as a whole.

Further, the first substrate 11 of the LCD device according to the first embodiment comprises common bus lines 52, each of which is extended in parallel to a corresponding one of the gate bus lines 55. These common bus lines 52 are provided for electrical interconnection among the common electrodes 72 formed in the respective pixel regions P. Each of the common bus lines 52 is located near the upper end of each pixel region P and is apart from a corresponding one of the gate bus lines 55 at a predetermined distance. Here, one of the gate bus lines 55 is placed near the bottom of the pixel region P while a corresponding one of the common bus lines 52 is placed near the top of the pixel region P.

The gate bus lines 55, the drain bus lines 56, and the common bus lines 52 are made of opaque metallic materials, respectively.

In each of the pixel regions P, two belt-shaped (or stripe-shaped) light-shielding electrodes 53 extending respectively along the two drain bus lines 56 that define the pixel region P are provided. These light-shielding electrodes 53 are not electrically connected to any other electrodes and any bus lines provided near the electrodes 53, and are electrically isolated.

As shown in FIG. 3, the light-shielding electrode 53 positioned at the left side of the pixel region P is adjacent to the right edge of the drain bus line 56 placed at the left of side of the pixel region P. This light-shielding electrode 53 is extended in parallel to this drain bus line 56 and is apart from the same at a predetermined distance. This light-shielding electrode 53 is not overlapped with the corresponding common bus line 52 and the corresponding gate bus line 55 to the pixel region P.

The light-shielding electrode 53 positioned at the right side of the pixel region P is adjacent to the left edge of the drain bus line 56 placed at the right side of the pixel region P. This light-shielding electrode 53 is extended in parallel to this drain bus line 56 and is apart from the same at a predetermined distance. This light-shielding electrode 53 is not overlapped with the corresponding common bus line 52 and the corresponding gate bus line 55 to the pixel region P.

For each of the pixel regions P, a TFT 45 is formed near the intersection of the corresponding gate bus line 55 and the corresponding drain bus line 56. The TFT 45 is formed by a gate electrode (not shown) united with the corresponding gate bus line 55; an island-shaped semiconductor film 43 overlapped with the gate electrode in such a way that a gate insulating film 57 intervenes between them; a drain electrode 56a united with the corresponding drain bus line 56 and overlapped with the semiconductor film 43; and a source electrode 42 formed to be opposite to the drain electrode 56a at a predetermined distance and overlapped with the semiconductor film 43. The gate electrode, the drain electrode 56a, and the source electrode 42 are made of opaque metallic materials, respectively.

Moreover, in each of the pixel regions P, a pixel electrode 71 and a common electrode 72 for generating liquid crystal driving electric field are formed, as shown in FIGS. 3 and 4. The pixel electrode 71 and the common electrode 72, each of which is made of a transparent conductive material, have comb-tooth-like plan shapes.

As shown in FIG. 3, the pixel electrode 71 comprises a belt-shaped base 71b placed on the side of the TFT 45 in the pixel region P, and four comb-tooth-like parts 71a protruding from the base 71b toward the opposite side to the TFT 45 (toward the upper side in FIG. 3) in the pixel region P. The base 71b is not overlapped with the corresponding gate bus line 55 but is overlapped with the source electrode 42 of the corresponding TFT 45. All the comb-tooth-like parts 71a are extended in parallel to the two drain bus lines 56 that define the pixel region P, and are arranged along the base 71b (along the lateral direction in FIG. 3) at equal intervals. The top ends of the respective comb-tooth-like parts 71a are located near the corresponding common bus line 52. Two of the comb-tooth-like parts 71a placed at outer positions are respectively overlapped with the two corresponding light-shielding electrodes 53 existing near the two drain bus lines 56 that define the pixel region P. This is to shield the light that leaks through the neighborhoods of the respective drain bus lines 56 by the light-shielding electrodes 53. The comb-tooth-like parts 71a are somewhat narrower in width than the light-shielding electrodes 53. The pixel electrode 71 is electrically connected to the source electrode 42 of the corresponding TFT 45 at the base 71b by way of a corresponding one of contact holes 61.

The common electrode 72 comprises a belt-shaped base 72b placed on the opposite side to the TFT 45 in the pixel region P, and three comb-tooth-like parts 72a protruding from the base 72b toward the side of the TFT 45 (toward the lower side in FIG. 3) in the pixel region P. The base 72b is entirely overlapped with the corresponding common bus line 52. All the comb-tooth-like parts 72a are extended in parallel to the two drain bus lines 56 that define the pixel region P, and are arranged along the base 72b (along the lateral direction in FIG. 3) at equal intervals. Accordingly, these comb-tooth-like parts 72a are parallel to the comb-tooth-like parts 71a of the pixel electrode 71 and the drain bus lines 56. The top ends of the respective comb-tooth-like parts 72a are located near the base 71b of the pixel electrode 71. The three comb-tooth-like parts 72a and the four comb-tooth-like parts 71a are arranged alternately along the gate and common bus lines 55 and 52. Therefore, it may be said that these comb-tooth-like parts 72a and 71a are mated with each other. The common electrode 72 is electrically connected to the corresponding common bus line 52 at the base 72b by way of a corresponding one of contact holes 62.

As shown in FIG. 5, the LCD device according to the first embodiment comprises the first substrate (i.e., an active-matrix substrate) 11 having the structure of FIG. 3, a second substrate (i.e., an opposite substrate) 12 opposed to the first substrate 11 at a predetermined gap, and a liquid crystal layer 20 placed between the substrates 11 and 12.

The gate bus lines 55, the common bus lines 52, the light-shielding electrodes 53, and the gate electrodes of the TFTs 45 are formed on the surface of the glass plate 11a of the first substrate 11. The gate insulating film 57 is formed on the surface of the glass plate 11a to cover the gate bus lines 55, the common bus lines 52, the light-shielding electrodes 53, and the gate electrodes. (Only the light-shielding electrodes 53 are shown in FIG. 5.) The gate electrodes are united with the corresponding gate bus lines 55. The drain bus lines 56, the semiconductor films 43 of the TFTs 45, the drain electrodes 56a, and the source electrodes 42 are formed on the gate insulating film 57. (Only the drain bus lines 56 are shown in FIG. 5.) A protective insulating film 59 is formed on the gate insulating film 57 to cover the drain bus lines 56, the semiconductor films 43, the drain electrodes 56a, and the source electrodes 42. The pixel electrodes 71 and the common electrodes 72 are formed on the protective insulating film 59. (Only the comb-tooth-like parts 71a of the pixel electrode 71 and the comb-tooth-like parts 72a of the common electrode 72 are shown in FIG. 5.)

As explained above, the common bus lines 52 are formed on the surface of the glass plate 11a, and the drain bus lines 56 are formed on the gate insulating film 57. Therefore, the common bus lines 52 are placed on a lower layer than the drain bus lines 56 (in other words, on a further layer from the liquid crystal layer 20 than the drain bus lines 56). Similarly, since the gate bus lines 55 are formed on the surface of the glass plate 11a, the gate bus lines 55 also are placed on a lower layer than the drain bus lines 56 (in other words, on a further layer from the liquid crystal layer 20 than the drain bus lines 56). The pixel electrodes 71 and the common electrodes 72 are formed on the protective insulating film 59 and therefore, the pixel and common electrodes 71 and 72 are placed on an upper layer than the drain bus lines 56 (in other words, on a nearer layer to the liquid crystal layer 20 than the drain bus lines 56).

On the surface (i.e., the inner face) of the first substrate 11 having the above-described structure, in other words, on the protective insulating film 59, an alignment film 31 made of an organic polymer is formed. Therefore, the pixel electrodes 71 and the common electrodes 72 are covered with the alignment film 31. The surface of the alignment film 31 is subjected to a predetermined aligning treatment.

On the other hand, a color layer 82 including the three primary colors of red (R), green (G) and blue (B) is formed on the surface of the glass plate 12a of the second substrate 12 corresponding to the respective pixel regions P. A light-shielding black matrix layer 81 is formed on the surface of the glass plate 12a in the remaining region excluding the regions corresponding to the pixel regions P. The color layer 82 is formed by a red color sublayer 82R, a green color sublayer 82G, and a blue color sublayer 82B, each of which is patterned to have a predetermined shape. The plan shape or pattern of the black matrix 81 is determined in such a way as to cover the structural elements formed on the first substrate 11 by using opaque metallic materials (i.e., the gate bus lines 55, the drain bus lines 56, the common bus lines 52, the light-shielding electrodes 53, and the TFTs 45) and to define rectangular openings (i.e., light transmission areas) in the respective pixel regions P. The color layer 82 is selectively placed in these openings or light transmission areas.

The color layer 82 and the black matrix layer 81 are covered with an overcoat film 85. The overcoat film 85, which is formed to cover the whole surface of the glass plate 12a, is provided for protecting the color layer 82 and the black matrix layer 81 and for planarizing the level differences generated by the color layer 82 and the black matrix layer 81. Columnar spacers (not shown) are arranged on the black matrix layer 81 to keep the gap between the first and second substrates 11 and 12.

On the surface (i.e., the inner face) of the second substrate 12 having the above-described structure, in other words, on the overcoat film 85, an alignment film 32 made of an organic polymer is formed. Therefore, the columnar spacers are covered with the alignment film 32. The surface of the alignment film 32 is subjected to a predetermined aligning treatment.

The first substrate (i.e., the active-matrix substrate) 11 and the second substrate (i.e., the opposite substrate) 12 are superposed on each other at a predetermined gap in such a way that their surfaces on which the alignment films 31 and 32 are respectively formed are directed inward and opposed to each other. A liquid crystal material is confined in the space between the first and second substrates 11 and 12, forming the liquid crystal layer 20. In other words, the liquid crystal layer 20 is sandwiched and held by these two substrates 11 and 12. A pair of polarizer plates (not shown) is arranged on the outer surfaces of the substrates 11 and 12 (i.e., the backs of the glass plates 11a and 12a), respectively.

Since the surfaces of the alignment films 31 and 32 are respectively subjected to the predetermined aligning treatments, the liquid crystal molecules 21 existing in the liquid crystal layer 20 are aligned in parallel along a predetermined direction shifted at a fixed angle (e.g., approximately 15° clockwise) from the vertical or longitudinal direction of FIG. 3 when no electric field is applied, as shown by the arrow in FIG. 3. This means that the initial alignment direction of the liquid crystal molecules 21 is defined at the direction indicated by the arrow in FIG. 3. Moreover, the transmission axes of the pair of polarizer plates are crossed at right angles. The transmission axis of one of the pair of polarizer plates is in accordance with the alignment direction of the liquid crystal molecules 21 when no electric field is applied (i.e., the initial alignment direction).

Fabrication Method of First Embodiment

Next, a fabrication method of the LCD device according to the first exemplary embodiment shown in FIGS. 3 to 5 will be explained below.

The first substrate (active-matrix substrate) 11 is fabricated in the following way.

First, a Cr film is formed on the whole surface of the glass plate 11*a* and patterned to have a predetermined shape, thereby forming the gate electrodes, the gate bus lines 55, the common bus lines 52, and the light-shielding electrodes 53 on the surface of the glass plate 11*a*. The gate electrodes are formed in such a way as to be united with the corresponding gate bus lines 55. Next, the gate insulating film 57, which is made of $SiN_x$, is formed on the whole surface of the glass plate 11*a* to cover the gate electrodes, the gate bus lines 55, the common bus lines 52, and the light-shielding electrodes 53.

Subsequently, an a-Si film is formed on the gate insulating film 57 and patterned to result in island-like parts, thereby forming the semiconductor films 43 for the TFTs 45. Each of the island-shaped semiconductor films 43 is placed at a position overlapping with a corresponding one of the gate bus lines 55 in such a way that the gate insulating film 57 intervenes between them. Moreover, a Cr film is formed on the gate insulating film 57 and patterned, thereby forming the drain bus lines 56, the drain electrodes 56*a*, and the source electrodes 42 on the gate insulating film 57. The drain electrodes 56*a* are formed in such a way as to be united with the corresponding drain bus lines 56. Thereafter, the protective insulating film 59, which is made of $SiN_x$, is formed over the whole surface of the glass plate 11*a*, thereby covering the drain bus lines 56, the drain electrodes 56*a*, and the source electrodes 42.

Following this, the protective insulating film 59 is selectively removed at the predetermined positions superposed on the respective source electrodes 42, thereby forming the contact holes 61 that reach the corresponding source electrodes 42. Moreover, the protective insulating film 59 and the gate insulating film 57 are selectively removed at the predetermined positions superposed on the respective common bus lines 52, thereby forming the contact holes 62 that reach the corresponding common bus lines 52.

Subsequently, a transparent conductive film, which is made of ITO or the like, is formed on the protective insulating film 59 and patterned to have a predetermined shape, thereby forming the pixel electrodes 71 each having the comb-tooth-like parts 71*a* and the common electrodes 72 each having the comb-tooth-like parts 72*a* on the protective insulating film 59. At this time, the pixel electrodes 71 are electrically connected to the corresponding source electrodes 42 by way of the corresponding contact holes 61. The common electrodes 72 are electrically connected to the corresponding common bus lines 52 by way of the corresponding contact holes 62. In this way, the first substrate 11 is fabricated.

The second substrate (opposite substrate) 12 is fabricated in the following way.

First, the black matrix layer 81 and the color layer 82 each having the predetermined shape or pattern are formed on the surface of the glass plate 12*a*. When the color layer 82 is formed, the red color sublayer 82R, the green color sublayer 82G, and the blue color sublayer 82B each having a predetermined shape are successively formed on the surface of the glass plate 12*a* in an appropriate order. Next, the overcoat film 85 is formed over the whole surface of the glass plate 12*a*, covering the black matrix layer 81 and the color layer 82. Thereafter, the columnar spacers (not shown) are formed on the overcoat film 85. In this way, the second substrate 12 is fabricated.

Following this, the alignment films 31 and 32, which are made of polyimide, are respectively formed on the surface of the first substrate 11 and the surface of the second substrate 12 fabricated in the above-described manners. The surfaces of the alignment films 31 and 32 are respectively subjected to the predetermined aligning treatments uniformly.

Thereafter, the first and second substrates 11 and 12 are superposed on each other to have a predetermined gap, such as 4.0 μm. Next, in a vacuum chamber (not shown), a predetermined nematic liquid crystal material whose refractive index anisotropy is, for example, 0.075 is injected into the space between the substrates 11 and 12 and then, the space is sealed. After the sealing operation of the space is completed, the polarizer plates (not shown) are respectively adhered on the outer surfaces of the substrates 11 and 12. As a result, the LCD panel is completed.

A predetermined driver LSI and a predetermined backlight unit are mounted on the LCD panel thus fabricated. As a result, the LCD device according to the first embodiment having the structure shown in FIGS. 3 to 5 is completed.

With the lateral electric field type LCD device according to the first embodiment shown in FIGS. 3 to 5, the liquid crystal driving electric field is uniformly generated along the approximately lateral (horizontal) direction of FIG. 3 when voltages are applied. For this reason, the alignment state of the liquid crystal molecules 21 existing in the liquid crystal layer 20, which have been aligned along the initial alignment direction (i.e., the direction indicated by the arrow in FIG. 3) when no voltage is applied, is changed by the applied liquid crystal driving electric field in such a way that the liquid crystal molecules 21 are rotated clockwise in planes approximately parallel to the first and second substrate 11 and 12. Since the transmittances in the respective pixel regions P (i.e., the respective pixels) are modulated by this alignment state change of the liquid crystal molecules 21, images can be displayed as desired.

Moreover, with the lateral electric field type LCD device according to the first embodiment, both of the pixel electrodes 71 and the common electrodes 72 for generating the liquid crystal driving electric field are made of transparent conductive material and therefore, light penetrates through the regions where the pixel and common electrodes 71 and 72 are present. For this reason, the aperture ratio and the transmittance are improved compared with the case where the pixel electrodes 71 and the common electrodes 72 are made of an opaque metal or metals.

In addition, since the amount of the opaque metallic parts existing in the openings of the black matrix layer 81 is reduced in the above-described manner, the scattering of light caused by the edges of the opaque metallic parts and the alignment distortion of the liquid crystal molecules 21 caused by the level differences in the vicinities of the same edges are suppressed. The scattering of light and the alignment distortion of the liquid crystal molecules 21 will be causes of optical leakage when black is displayed. However, with the lateral electric field type LCD device of the first embodiment, the scattering of light and the alignment distortion of the liquid crystal molecules 21 are suppressed and therefore, the display contrast is improved.

If the opaque metallic parts are present in the openings of the black matrix layer 81, the incident light will be reflected by these opaque metallic parts when this LCD device is used in a comparatively well-lighted place, and as a result, the "light place contrast" is likely to deteriorate conspicuously. However, the LCD device of the first embodiment does not include such the opaque metallic parts in the openings of the black matrix layer 81. Accordingly, the light place contrast of this device is prevented from deteriorating.

Furthermore, the two light-shielding electrodes 53 are respectively provided in the vicinities of the two drain bus lines 56 that define the pixel region P. The areas between the light-shielding electrodes 53 and the corresponding drain bus lines 56 adjacent thereto are covered with the black matrix layer 81 placed on the second substrate 12. Therefore, the leakage of light and the vertical cross talk induced by the leaked electric field from the respective drain bus lines 56 are restrained.

Figure 2:
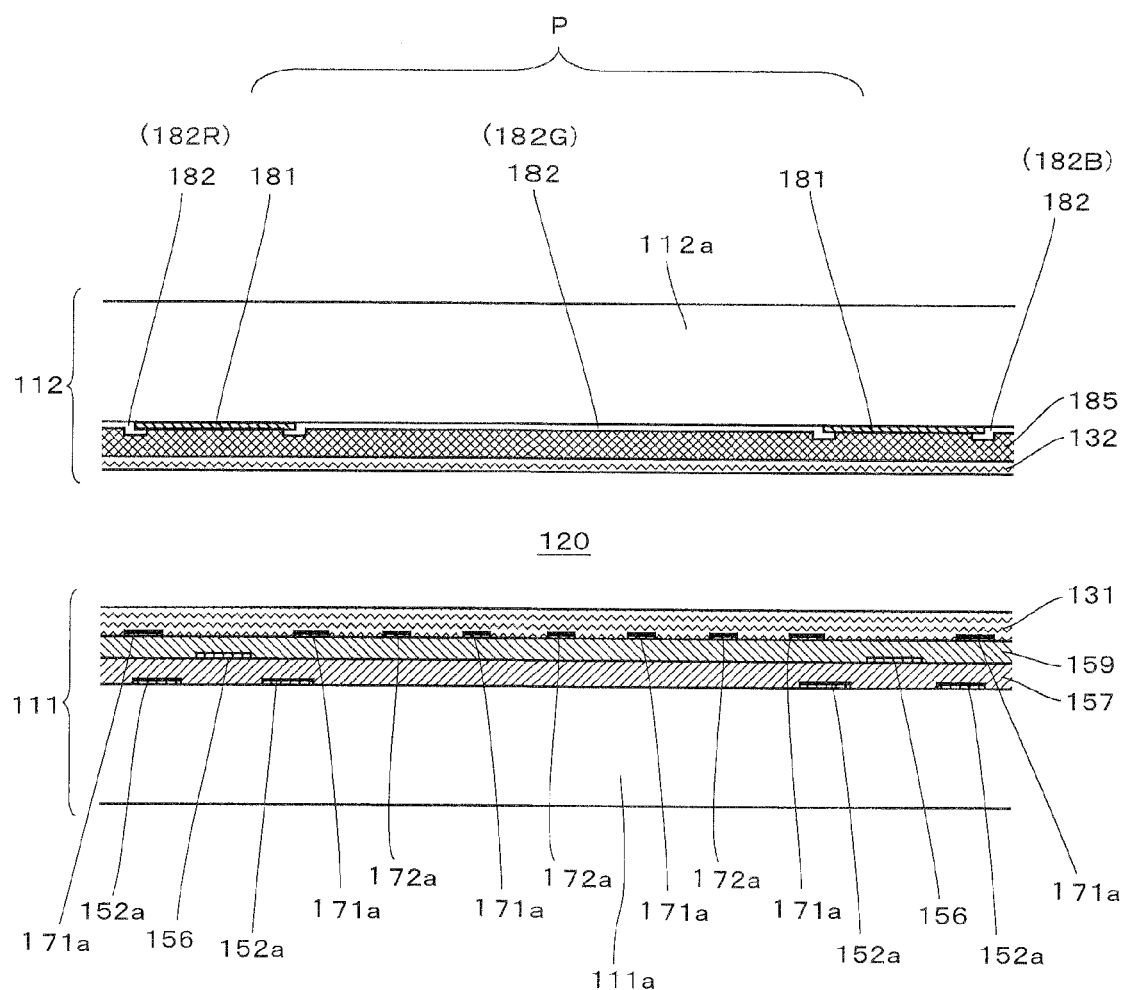
FIG. 2 is a partial cross-sectional view along the line II-II in FIG. 1.

These points or advantages are the same as those of the above-described related-art LCD device shown in FIGS. 1 and 2. However, the LCD device according to the first embodiment of the invention is different from the related-art LCD device in that the two light-shielding electrodes 53 provided in each of the pixel regions P are not electrically connected to any other electrodes and any bus lines existing in their vicinities, in other words, the electrodes 53 are electrically isolated.

Specifically, similar to the above-described related-art LCD device, the two light-shielding electrodes 53 are adjacent to the drain bus lines 56 that define the pixel region P, and are extended along the same drain bus lines 56. However, the light-shielding electrodes 53 are electrically isolated from their neighboring electrodes and bus lines and are overlapped with the adjoining comb-tooth-shaped parts 71a of the pixel electrode 71 corresponding to the pixel region P. Therefore, in the operating state, the light-shielding electrodes 53 will be electrically floating. In this state, the electric potentials of the light-shielding electrodes 53 will be close to the electric potential of the pixel electrode 71 (which is equivalent to the signal voltage applied). This is because the isolated light-shielding electrodes 53 are overlapped with the comb-tooth-like parts 71a of the pixel electrode 71 that extend along the drain bus lines 56 in their vicinities in such a way that the gate insulating film 57 intervenes between them. For this reason, the electric potential differences between the drain bus lines 56 and the corresponding light-shielding electrodes 53 are very small, in other words, the coupling or parasitic capacitances between the drain bus lines 56 and the corresponding light-shielding electrodes 53 are very small.

On the other hand, with the related-art LCD device shown in FIGS. 1 and 2, the light-shielding parts 152a are united with the corresponding common bus line 152 and therefore, the electric potential of the light-shielding parts 152a will be equal to that of the corresponding common electrode 172. Therefore, the electric potential difference between the drain bus line 156 and its corresponding common bus line 152 will be equal to the difference between the electric potential equivalent to the signal voltage supplied to the drain bus line 156 and the electric potential of the common electrode 172. This means that the coupling or parasitic capacitance between the drain bus line 156 and its corresponding light-shielding parts 152a will be considerably large.

As explained above, with the LCD device of the first embodiment, the coupling or parasitic capacitances between the drain bus lines 56 and their corresponding light-shielding electrodes 53 are smaller than the coupling or parasitic capacitance between the drain bus line 156 and the corresponding common bus line 152 (i.e., the corresponding light-shielding parts 152a) of the related-art LCD device, and as a result, the lateral cross talk is suppressed. Moreover, because of the suppression of the lateral cross talk, the image quality is improved.

In addition, the two light-shielding electrode 53 arranged along the respective drain bus lines 56 in each of the pixel regions P will be electrically floating in the operating state; however, the light-shielding electrodes 53 are respectively overlapped with the two outer comb-tooth-like parts 71a of the corresponding pixel electrode 71 in such a way that the gate insulating film 57 intervenes between them. Therefore, the electric potentials of the light-shielding electrodes 53 in the operating state will be close to the electric potential of the corresponding pixel electrode 71. As a result, an electric field that changes strongly the alignment state of the liquid crystal molecules 21 from their initial alignment direction does not arise between the two outer comb-tooth-like parts 71a and the light-shielding electrodes 53. This means that stable display is realized.

Structure of Second Embodiment

Figure 6:
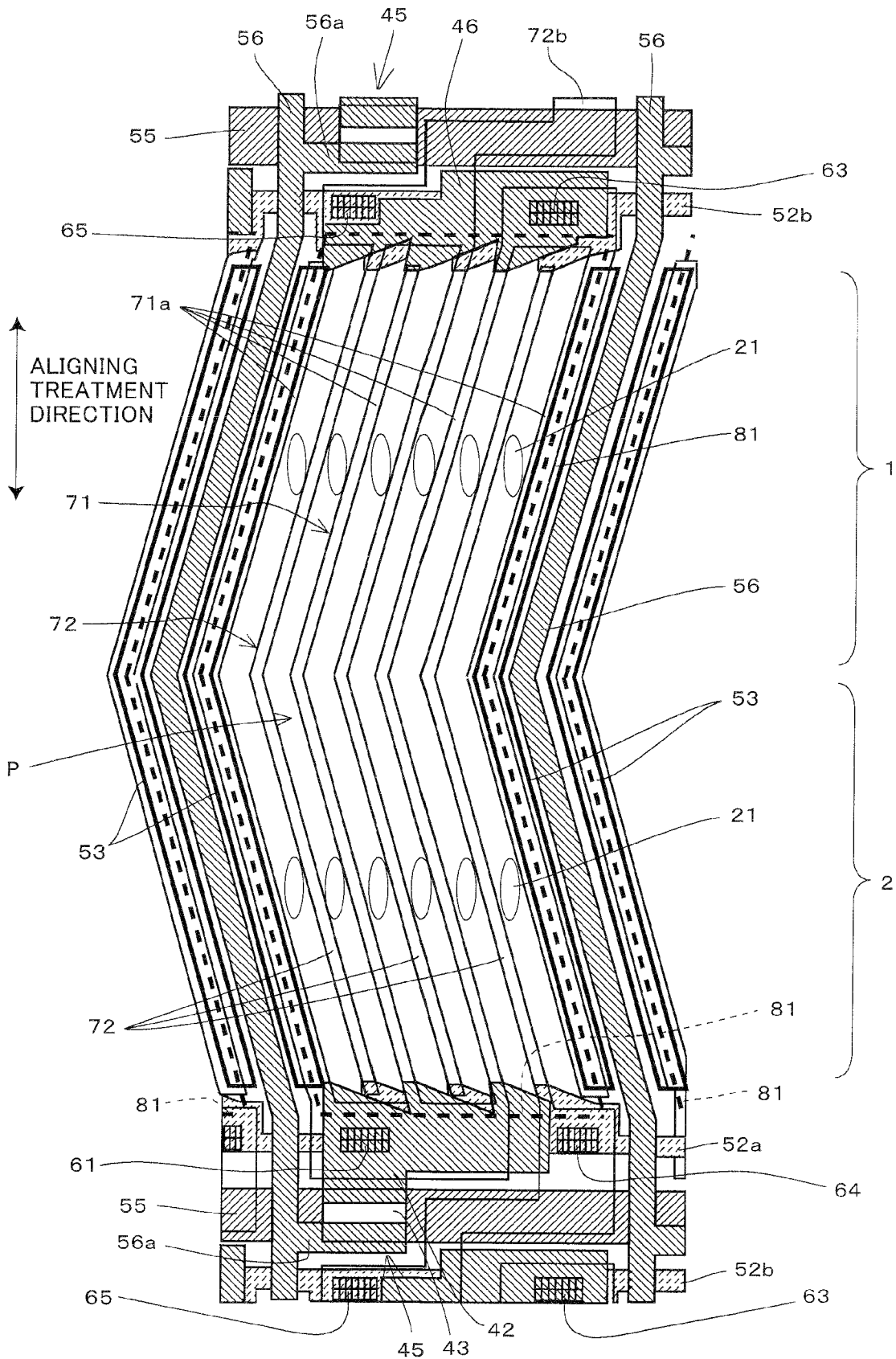
FIG. 6 is a partial plan view showing the structure of the active-matrix substrate used in a lateral electric field type active-matrix addressing LCD device according to a second exemplary embodiment of the present invention.
Figure 7:
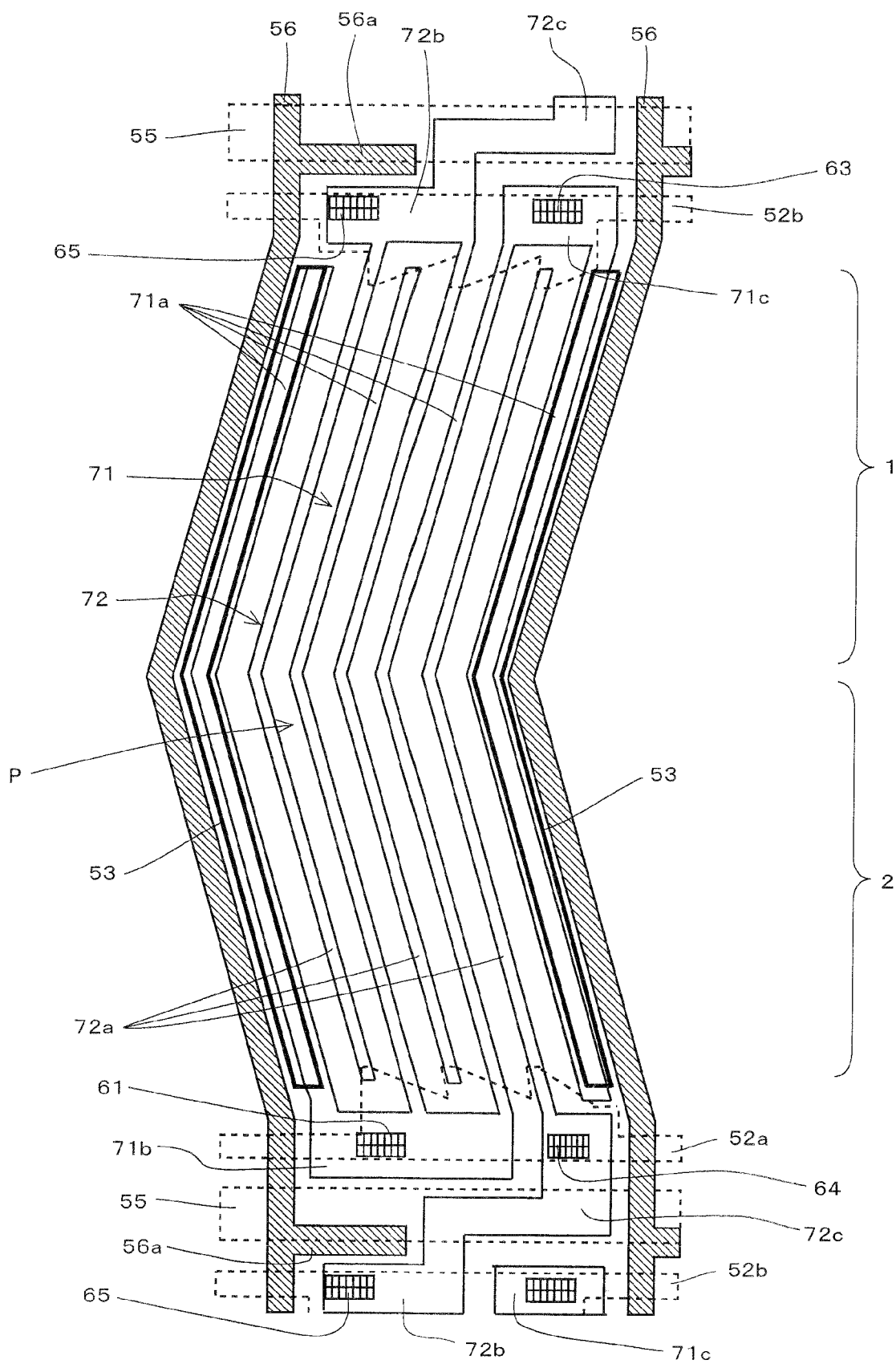
FIG. 7 is an explanatory partial plan view showing the plan shapes of the pixel electrode and the common electrode used in the active-matrix substrate shown in FIG. 6.

FIGS. 6 and 7, and FIGS. 8A to 8D show the structure of a lateral electric field (IPS) type active-matrix addressing LCD device according to a second exemplary embodiment of the present invention. FIG. 6 is a partial plan view of the active-matrix substrate used in this LCD device. FIG. 7 is an explanatory partial plan view showing the plan shapes of the pixel electrode and the common electrode used in this LCD device. FIGS. 8A to 8D are explanatory plan views showing the plan shapes of the common bus line, the source electrode, and the auxiliary electrode used in this LCD device, respectively. These figures show the structure of one of the pixel regions.

The structure of the LCD device according to the second embodiment resembles that of the LCD device according to the first embodiment shown in FIGS. 3 to 5 at many points. However, the former is different from the latter in that the pixel electrodes 71 and the common electrodes 72 for generating lateral electric field, and the drain lines 56 are bent at their middle positions to have approximately V-shaped patterns, thereby intentionally making the liquid crystal driving (rotating) directions different from each other at each side of their bent positions in the operating state. Moreover, the plan shapes of the pixel electrodes 71, the common electrodes 72, and the source electrodes 42 are somewhat different from each other.

Accordingly, the explanation about the same or common structural components will be omitted here by attaching the same reference numerals as used in the above-described first embodiment to these components, and these structural differences will be mainly explained below.

The first substrate (i.e., the active-matrix substrate) 11 of the LCD device according to the second embodiment comprises gate bus lines 55 extended along the lateral (horizontal) direction of FIG. 6 and arranged at equal intervals along the longitudinal (vertical) direction thereof, and drain bus lines 56 extended along the longitudinal direction of FIG. 6 and arranged at equal intervals along the lateral direction thereof. A pixel region P is formed in each of the approximately rectangular regions defined by the gate bus lines 55 and the drain bus lines 56. These pixel regions P are arranged in a matrix array as a whole.

The plan shape of the gate bus lines 55 is the same as that of the first embodiment. The plan shape of the drain bus lines 56 is different from that of the first embodiment. Specifically, the drain bus lines 56 are bent at their middle positions to have approximately V-shaped patterns in each of the pixel regions P, thereby dividing the pixel region P into a first subregion 1 located above in FIG. 6 and a second subregion 2 located below in the same figure. The inclination direction of the drain bus lines 56 in the first subregion 1 is clockwise with respect to the longitudinal (vertical) direction of FIG. 7 while the inclination direction of the drain bus lines 56 in the second subregion 2 is counterclockwise. The inclination angle in the first subregion 1 is equal in magnitude to that in the second subregion 2.

Furthermore, the LCD device according to the second embodiment comprises common bus lines 52a and 52b extending in parallel to the respective gate bus lines 55. Each of the common bus lines 52a is located near the corresponding gate bus line 55 at a predetermined distance, which is adjacent to the bottom of the pixel region P. Each of the common bus lines 52b is located apart from the corresponding common bus line 52a and the corresponding gate bus line 55 along the longitudinal direction of FIG. 6, which is adjacent to the top of the pixel region P.

As shown in FIG. 6, the common bus line 52a, which is located at a lower position in FIG. 6, is extended in parallel to the corresponding gate bus line 55 located at a lower position. Since the common bus line 52a is slightly shifted upward from the corresponding gate bus line 55, the common bus line 52a is placed near the same gate bus line 55. Similarly, the common bus line 52b, which is located at an upper position in FIG. 6, is extended in parallel to the corresponding gate bus line 55. Since the common bus line 52b is largely shifted upward from the corresponding gate bus line 55 toward the gate bus line 55 for the next upper pixel region P, the common bus line 52b is placed near the same gate bus line 55. The common bus line 52a and 52b are provided for electrical interconnection among the common electrodes 72 arranged in the respective pixel regions P.

Figure 8A:
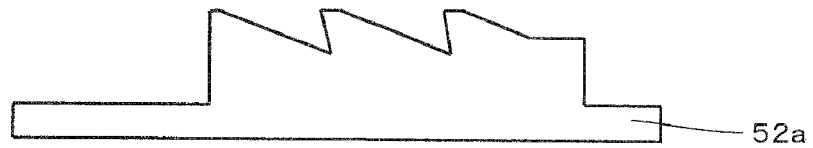
FIG. 8A is an explanatory plan view showing the plan shape of the widened part of one of the common bus lines used in the active-matrix substrate shown in FIG. 6.

The common bus line 52a, which has a plan shape shown in FIG. 8A, comprises a relatively wider part (i.e., a widened part) whose inner (upper) edge is sawtooth-shaped for each of the pixel regions P. Similar to the common bus line 52a, the common bus line 52b, which has a plan shape shown in FIG. 8C, comprises a relatively wider part (i.e., a widened part) whose inner (lower) edge is sawtooth-shaped for each of the pixel regions P. The plan shapes of the common bus lines 52a and 52b are slightly different from each other in accordance with the structures in which the common bus lines 52a and 52b are placed.

The gate bus lines 55, the drain bus lines 56, and the common bus lines 52a and 52b are made of opaque metallic materials, respectively.

In each of the pixel regions P, two belt-shaped (or stripe-shaped) light-shielding electrodes 53 extending respectively along the two drain bus lines 56 that define the pixel region P are provided. The light-shielding electrodes 53 are bent at their middle positions to have approximately V-shaped patterns, similar to the drain bus lines 56. Moreover, the light-shielding electrodes 53 are not electrically connected to any other electrodes and any bus lines provided near the same electrodes 53, and are electrically isolated. The light-shielding electrodes 53 have the same plan shape (pattern) as each other. The upper half of each light-shielding electrode 53 with respect to its bent middle position belongs to the first subregion 1 while the lower half thereof belongs to the second subregion 2.

As shown in FIG. 6, the light-shielding electrode 53 positioned at the left side of the pixel region P is adjacent to the right edge of the drain bus line 56 (which is bent V-shaped) placed at the left side of the pixel region P. This light-shielding electrode 53 is extended in parallel to this drain bus line 56 and is apart from the same at a predetermined interval. This light-shielding electrode 53 is not intersected with the corresponding common bus lines 52a and 52b and the corresponding gate bus line 55 to the pixel region P.

The light-shielding electrode 53 positioned at the right side of the pixel region P 6 is adjacent to the left edge of the drain bus line 56 (which is bent V-shaped) placed at the right side of the pixel region P. This light-shielding electrode 53 is extended in parallel to this drain bus line 56 and is apart from the same at a predetermined interval. This light-shielding electrode 53 is not intersected with the corresponding common bus lines 52a and 52b and the corresponding gate bus line 55 to the pixel region P.

For each of the pixel regions P, a TFT 45 is formed near the intersection of the corresponding gate bus line 55 and the corresponding drain bus line 56. The TFT 45 comprises a gate electrode (not shown) united with the corresponding gate bus line 55; an island-shaped semiconductor film 43 overlapped with the gate electrode in such a way that a gate insulating film 57 intervenes between them; a drain electrode 56a united with the corresponding drain bus line 56 and overlapped with the semiconductor film 43; and a source electrode 42 formed to be opposite to the drain electrode 56a at a predetermined distance and overlapped with the semiconductor film 43.

Figure 8B:
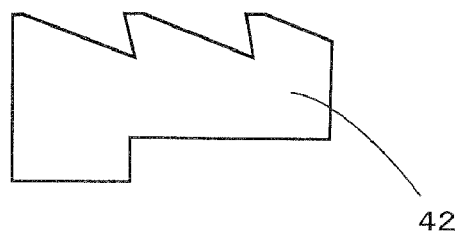
FIG. 8B is an explanatory plan view showing the plan shape of the source electrode used in the active-matrix substrate shown in FIG. 6.
Figure 8C:
FIG. 8C is an explanatory plan view showing the plan shape of the widened part of the other of the common bus lines used in the active-matrix substrate shown in FIG. 6.
Figure 8D:
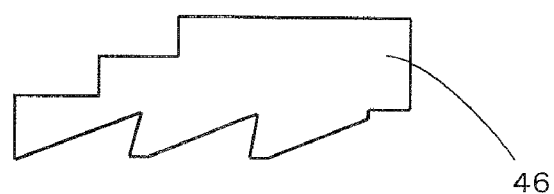
FIG. 8D is an explanatory plan view showing the plan shape of the auxiliary electrode used in the active-matrix substrate shown in FIG. 6.

The source electrode 42, which has a plan shape shown in FIG. 8B, is larger than that of the first embodiment. The source electrode 42 is enlarged to such a level as to be overlapped with the corresponding common bus line 52a. The inner (upper) edge of the source electrode 42 is sawtooth-shaped.

At the position overlapping with the common bus line 52b in each of the pixel regions P, an auxiliary electrode 46 having a similar plan shape to the source electrode 42 is formed. The auxiliary electrode 46 is placed on the same layer as the source electrode 42 and is made of the same material as the source electrode 42. The auxiliary electrode 46 has a plan shape shown in FIG. 8D. Similar to the source electrode 42, the inner (lower) edge of the auxiliary electrode 46 is sawtooth-shaped. The plan shapes of the source electrode 42 and the auxiliary electrode 46 are slightly different from each other in accordance with the structures in which the source electrode 42 and the auxiliary electrode 46 are placed. The auxiliary electrode 46 is electrically connected to a base 71c of a corresponding pixel electrode 71 explained later by way of a corresponding one of contact holes 63.

In each of the pixel regions P, a pixel electrode 71 and a common electrode 72 for generating liquid crystal driving electric field are formed, as shown in FIGS. 6 and 7. The pixel electrode 71 and the common electrode 72, each of which is made of a transparent conductive material and is comb-tooth-shaped, are bent to have approximately V-like plan shapes similar to the drain bus lines 56.

As shown in FIG. 7, the pixel electrode 71 comprises a belt-shaped base 71b placed on the side of the TFT 45 in the pixel region P, a belt-shaped base 71c placed on the opposite side to the TFT 45 in the pixel region P, three approximately V-shaped, comb-tooth-like parts 71a protruding from the base 71b toward the opposite side to the TFT 45 (toward the upper side in FIG. 7) in the pixel region P, and an approximately V-shaped, comb-tooth-like part 71a protruding from the base 71c toward the side of the TFT 45 (toward the lower side in FIG. 7) in the pixel region P. The base 71c is joined to the top of one of the three comb-tooth-like parts 71a protruding from the base 71b located at the right side of the pixel region P. The base 71b is not overlapped with the corresponding gate bus line 55 but is overlapped with the source electrode 42 of the corresponding TFT 45. All of the four comb-tooth-like parts 71a are extended in parallel to the V-shaped drain bus lines 56 that define the pixel region P, and are arranged along the bases 71b and 71c (along the lateral direction in FIG. 7) at equal intervals. The top ends of the respective comb-tooth-like parts 71a protruding from the base 71b are located near the corresponding common bus line 52b. The top end of the comb-tooth-like part 71a protruding from the base 71c is located near the corresponding common bus line 52a. Two of the comb-tooth-like parts 71a placed at outer positions of the pixel electrode 71 are respectively overlapped with the two corresponding light-shielding electrodes 53 existing near the two drain bus lines 56 that define the pixel region P. The comb-tooth-like parts 71a are somewhat narrower in width than the light-shielding electrodes 53. The pixel electrode 71 is electrically connected to the source electrode 42 of the corresponding TFT 45 at the base 71b by way of a corresponding one of contact holes 61.

The common electrode 72 comprises an approximately L-shaped base 72b placed on the opposite side to the TFT 45 in the pixel region P, an approximately L-shaped base 72c placed on the side of the TFT 45 in the pixel region P, two comb-tooth-like parts 72a protruding from the base 72b toward the side of the TFT 45 (toward the lower side in FIG. 7), and a comb-tooth-like part 72a protruding from the base 72c toward the opposite side to the TFT 45 (toward the upper side in FIG. 7). The base 72b is entirely overlapped with the corresponding common bus line 52b. The base 72c is overlapped with the corresponding common bus line 52a and the corresponding gate bus line 55. All of the three comb-tooth-like parts 72a are extended in parallel to the two drain bus lines 56 that define the pixel region P, and are arranged along the bases 72b and 72c (along the lateral direction in FIG. 7) at equal intervals. Accordingly, the comb-tooth-like parts 72a are parallel to the comb-tooth-like parts 71a of the pixel electrode 71 and the drain bus lines 56. The top ends of the respective comb-tooth-like parts 72a are located near the base 71b of the pixel electrode 71. The three comb-tooth-like parts 72a and the four comb-tooth-like parts 71a are arranged alternately along the gate and common bus lines 55 and 52a and 52b. Therefore, it may be said that these comb-tooth-like parts 72a and 71a are mated with each other. The common electrode 72 is electrically connected to the corresponding common bus line 52b at the base 72b by way of a corresponding one of contact holes 62 and at the same time, is electrically connected to the corresponding common bus line 52a at the base 72c by way of a corresponding one of contact holes 64. In addition, as seen from FIG. 7, the bases 72b and 72c are joined to each other at the boundary between the two adjoining pixel regions P along the vertical direction of FIG. 7.

The source electrode 42 and the auxiliary electrode 46, both of which are electrically connected to the pixel electrode 71 and whose electric potentials will be equal to that of the pixel electrode 71, have the saw-tooth-like parts, respectively. Moreover, the common bus lines 52a and 52b, which are electrically connected to the common electrode 72 and whose electric potential will be equal to that of the common electrode 72, have the saw-tooth-like parts, respectively. The saw-tooth-like parts of the source electrode 42 and the auxiliary electrode 46 and those of the common bus lines 52a and 52b are alternately arranged along the gate bus lines 55 (along the lateral direction in FIG. 7). This is to rotate uniformly the liquid crystal molecules 21 along the opposite directions to each other in the first and second subregions 1 and 2. By using such the structure, the rotation directions of the liquid crystal molecules 21 near the top ends of the comb-tooth-like parts 71a of the pixel electrode 71 and the top ends of the comb-tooth-like parts 72a of the common electrode 72 can be approximately equalized to the rotation direction of the liquid crystal molecules 21 in the remaining regions in each of the first and second subregions 1 and 2.

The LCD device according to the second embodiment comprises the first substrate (an active-matrix substrate) 11 having the structure of FIG. 6, a second substrate (an opposite substrate) 12, and a liquid crystal layer 20, similar to the LCD device according to the first embodiment. However, the structures of the second substrate 12 and the liquid crystal layer 20 are the same as those used in the first embodiment. Therefore, the explanation about the structures of the second substrate 12 and the liquid crystal layer 20 are omitted here, and only the structure of the first substrate 11 according to the second embodiment will be explained below.

Since the cross-sectional structure of the LCD device according to the second embodiment along the V-V line in FIG. 3 is the same as that of the LCD device according to the above-described first embodiment, FIG. 5 will be referred to in the following explanation as necessary.

The gate bus lines 55, the common bus lines 52a and 52b, the light-shielding electrodes 53, and the gate electrodes of the TFTs 45 are formed on the surface of the glass plate 11a of the first substrate 11. The gate insulating film 57 is formed on the surface of the glass plate 11a to cover the gate bus lines 55, the common bus lines 52a and 52b, the light-shielding electrodes 53, and the gate electrodes. (Only the light-shielding electrodes 53 are shown in FIG. 5.) The gate electrodes are united with the corresponding gate bus lines 55. The drain bus lines 56, the semiconductor films 43 of the TFTs 45, the drain electrodes 56a, the source electrodes 42, and the auxiliary electrodes 46 are formed on the gate insulating film 57. (Only the drain bus lines 56 are shown in FIG. 5.) A protective insulating film 59 is formed on the gate insulating film 57 to cover the drain bus lines 56, the semiconductor films 43, the drain electrodes 56a, the source electrodes 42, and the auxiliary electrodes 46. The pixel electrodes 71 and the common electrodes 72 are formed on the protective insulating film 59. (Only the comb-tooth-like parts 71a of the pixel electrodes 71 and the comb-tooth-like parts 72a of the common electrodes 72 are shown in FIG. 5.) In this way, the common bus lines 52a and 52b are placed on the surface of the glass plate 11a, and the drain bus lines 56 are placed on the gate insulating film 57; therefore, the common bus lines 52a and 52b are placed on a lower layer than the drain bus lines 56 (in other words, on a further layer from the liquid crystal layer 20 than the drain bus lines 56). Similarly, since the gate bus lines 55 are placed on the surface of the glass plate 11a, the gate bus lines 55 also are placed on a lower layer than the drain bus lines 56 (in other words, on a further layer from the liquid crystal layer 20 than the drain bus lines 56). The pixel electrodes 71 and the common electrodes 72 are placed on the protective insulating film 59 and therefore, the pixel and common electrodes 71 and 72 are placed on an upper layer than the drain bus lines 56 (in other words, on a nearer layer to the liquid crystal layer 20 than the drain bus lines 56).

On the surface (i.e., the inner face) of the first substrate 11 having the above-described structure, in other words, on the protective insulating film 59, an alignment film 31 made of an organic polymer is formed. Therefore, the pixel electrodes 71 and the common electrodes 72 are covered with the alignment film 31. The surface of the alignment film 31 is subjected to a predetermined aligning treatment.

Because the surfaces of the alignment films 31 and 32 are respectively subjected to the predetermined aligning treatments, as shown by the arrow in FIG. 6, the liquid crystal molecules 21 in the liquid crystal layer 20 are aligned in parallel along the longitudinal (vertical) direction of FIG. 6 when no electric field is applied. This means that the initial alignment direction of the liquid crystal molecules 21 is defined at the direction indicated by the arrow in FIG. 6.

Fabrication Method of Second Embodiment

Next, a fabrication method of the LCD device according to the second exemplary embodiment shown in FIGS. 6 to 8 will be explained below.

First, a Cr film is formed on the whole surface of the glass plate 11a of the first substrate 11 and patterned to have a predetermined shape, thereby forming the gate electrodes, the gate bus lines 55, the common bus lines 52a and 52b, and the light-shielding electrodes 53 on the surface of the glass plate 11a. Next, the gate insulating film 57 made of $SiN_x$ is formed on the whole surface of the glass plate 11a to cover the gate electrodes, the gate bus lines 55, the common bus lines 52a and 52b, and the light-shielding electrodes 53.

Subsequently, an a-Si film is formed on the gate insulating film 57 and patterned to result in island-like parts, thereby forming the island-shaped semiconductor films 43 for the TFTs 45. Each of the island-shaped semiconductor films 43 is placed at a position overlapping with a corresponding one of the gate electrodes in such a way that the gate insulating film 57 intervenes between them. Moreover, a Cr film is formed on the gate insulating film 57 and patterned, thereby forming the drain bus lines 56, the drain electrodes 56a, the source electrodes 42, and the auxiliary electrodes 46 on the gate insulating film 57. Thereafter, the protective insulating film 59 made of $SiN_x$ is formed over the whole surface of the glass plate 11a, thereby covering the drain bus lines 56, the drain electrodes 56a, the source electrodes 42, and the auxiliary electrodes 46.

Following this, the protective insulating film 59 is selectively removed at the predetermined positions superposed on the respective source electrodes 42 and the respective auxiliary electrodes 46, thereby forming the contact holes 61 that reach the source electrodes 42 and the contact holes 65 that reach the auxiliary electrodes 46. Moreover, the protective insulating film 59 and the gate insulating film 57 are selectively removed at the predetermined positions superposed on the respective common bus lines 52a and 52b, thereby forming the contact holes 63 that reach the common bus lines 52b and the contact holes 64 that reach the common bus lines 52a.

Subsequently, a transparent conductive film made of ITO or the like is formed on the protective insulating film 59 and patterned to have a predetermined shape, thereby forming the pixel electrodes 71 having the comb-tooth-like parts 71a and the common electrode 72 having the comb-tooth-like parts 72a on the protective insulating film 59. At this time, the pixel electrodes 71 are electrically connected to the corresponding source electrodes 42 and the auxiliary electrodes 46 by way of the corresponding contact holes 61 and 65, respectively. The common electrodes 72 are electrically connected to the corresponding common bus lines 52b and 52a by way of the corresponding contact holes 63 and 64, respectively. In this way, the first substrate 11 is fabricated.

The second substrate 12 is fabricated in the same way as the above-described first embodiment.

Then, the LCD panel is formed in the same way as the first embodiment using the first and second substrates 11 and 12 thus fabricated, and a predetermined driver LSI and a predetermined backlight unit are mounted on this LCD panel. As a result, the LCD device according to the second embodiment having the structure shown in FIGS. 6 to 8 is completed.

As explained above, the lateral electric field type LCD device according to the second embodiment comprises the structure that the light-shielding electrodes 53 are respectively provided near the drain bus lines 56 in such a way as to be electrically isolated from any other electrodes and any bus lines in the neighborhood of the light-shielding electrodes 53, which is the same as the LCD device according to the first embodiment. Accordingly, it is apparent that the LCD device according to the second embodiment has the same advantages as those of the first embodiment.

However, with the lateral electric field type LCD device of the second embodiment, the direction of the liquid crystal driving electric field generated by the applied voltage is slightly inclined clockwise with respect to the lateral direction of FIG. 6 in the first subregion 1, and it is slightly inclined counterclockwise with respect to the lateral direction in the second subregion 2. Therefore, the liquid crystal molecules 21, which are initially aligned along the longitudinal direction of FIG. 6 uniformly when no electric field is applied, are rotated clockwise in the first subregion 1 and counterclockwise in the second subregion 2 by the liquid crystal driving electric field applied. In this way, the rotation directions of the liquid crystal molecules 21 in the first and second subregions 1 and 2 are opposite to each other and as a result, an additional advantage that the display coloring due to the change of the viewing angle can be restrained arises.

Moreover, with the lateral electric field type LCD device of the second embodiment, the common electrodes 72 provided in the respective pixel regions P are connected to each other by the common bus lines 52a and 52b along the lateral or horizontal direction of FIG. 6 and at the same time, they are connected to each other by their bases 72b and 72c along the longitudinal or vertical direction of the same figure in such a way as to be astride the gate bus lines 55. This means that the common electrodes 72 have a meshed structure as a whole. Therefore, the common electrodes 72 in the respective pixel regions P are difficult to be affected by the electric potential changes of the drain bus lines 56. Accordingly, it is more certain to suppress the lateral cross talk than the LCD device of the first embodiment, which results in an additional advantage that the image quality is improved furthermore.

Third Embodiment

Figure 9:
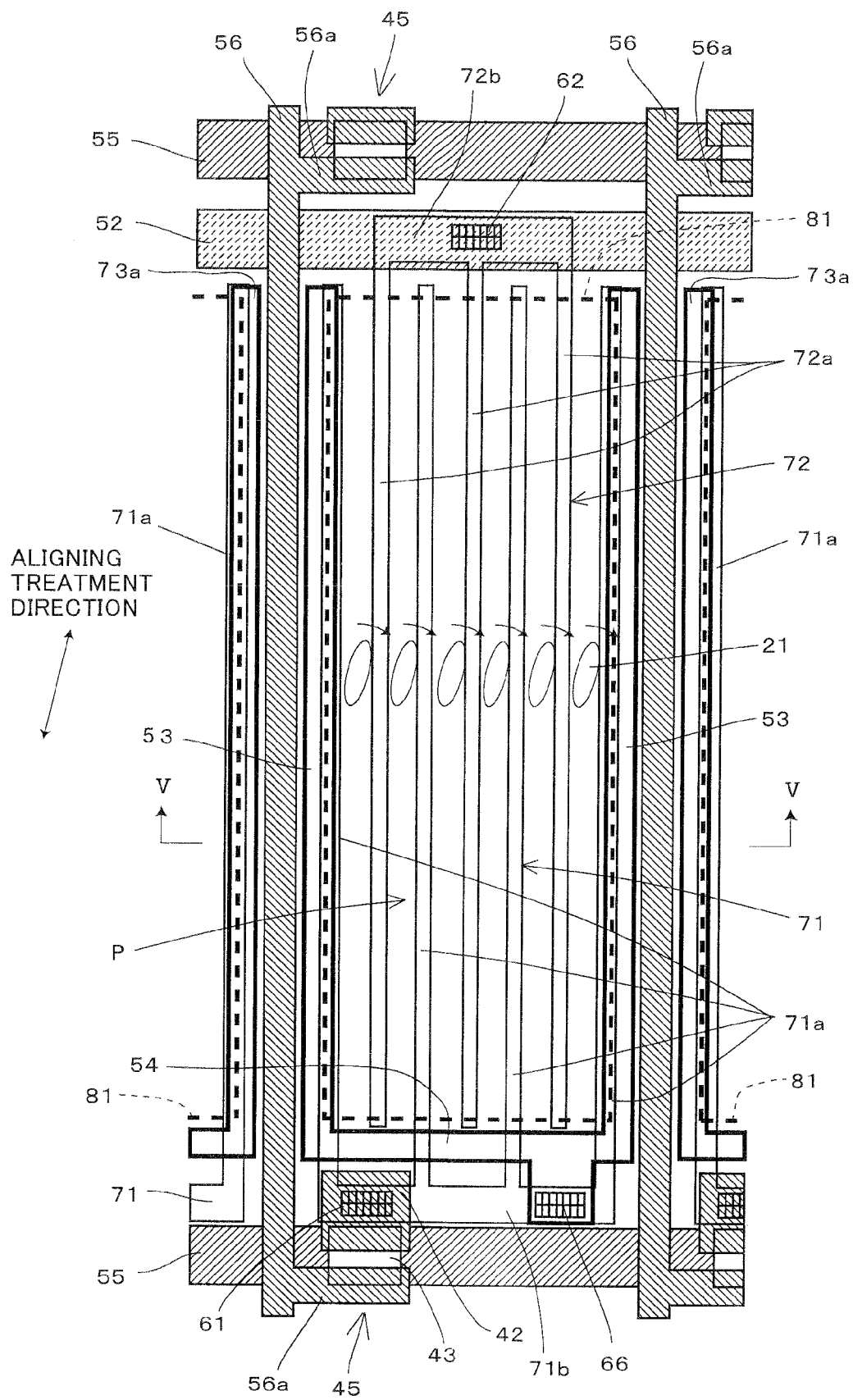
FIG. 9 is a partial plan view showing the structure of the active-matrix substrate used in a lateral electric field type active-matrix addressing LCD device according to a third exemplary embodiment of the present invention.
Figure 10:
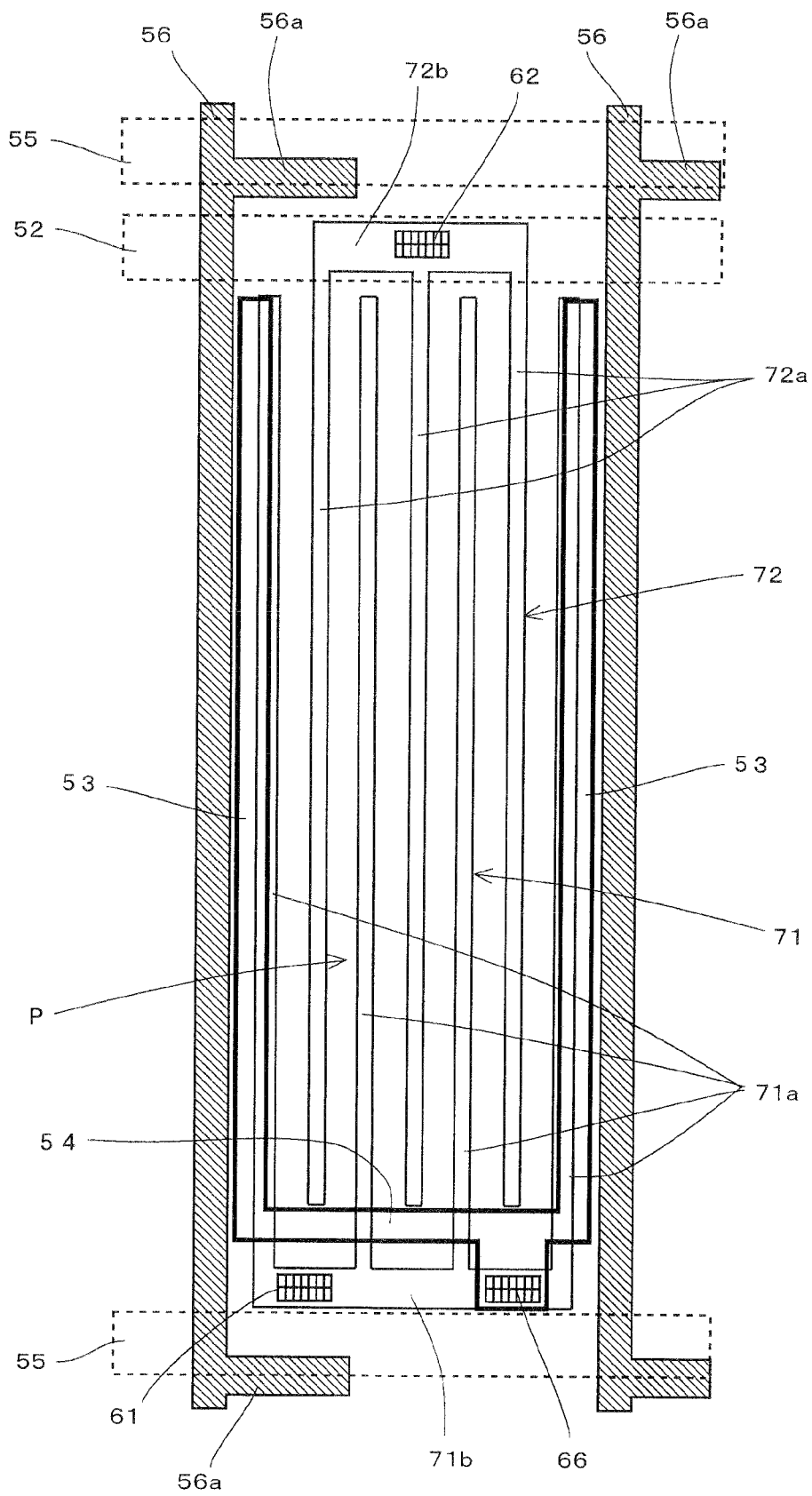
FIG. 10 is an explanatory partial plan view showing the plan shapes of the pixel electrode and the common electrode used in the active-matrix substrate shown in FIG. 9.

FIGS. 9 and 10 show the structure of a lateral electric field (IPS) type active-matrix addressing LCD device according to a third exemplary embodiment of the present invention. FIG. 9 is a partial plan view of the active-matrix substrate used in this LCD device. FIG. 10 is an explanatory partial plan view showing the plan shapes of the pixel electrode and the common electrode. These figures show the structure of one of the pixel regions.

The LCD device according to the third embodiment is the same in structure as that of the above-described first embodiment except that the two light-shielding electrodes 53 provided in each of the pixel regions P are electrically connected to each other and that the two light-shielding electrodes 53 are electrically connected to the corresponding pixel electrode 71 (which means that the light-shielding electrodes 53 are not electrically floating). Therefore, the explanation about the same structure is omitted here by attaching the same reference symbols as used in the first embodiment to the same elements.

With the LCD device of the third embodiment, similar to the LCD device of the above-described first embodiment, the two belt-shaped (or stripe-shaped) light-shielding electrodes 53 provided in each pixel region P are respectively extended along the two drain bus lines 56 that define the pixel region P in the vicinities of the same drain bus lines 56. However, the light-shielding electrodes 53 are not electrically isolated from their neighboring electrodes and bus lines. These two light-shielding electrodes 53 are electrically and mechanically connected to each other with an approximately belt-shaped connecting part 54 formed on the glass plate 11a near the corresponding TFT 45. The connecting part 54 is located near the corresponding gate bus line 55 and extended in parallel to the same.

A part of the connecting part 54 is protruded downward in FIG. 9 (i.e., toward the side of the TFT 45) to overlap with the base 71b of the corresponding pixel electrode 71. The connecting part 54 is electrically connected to the pixel electrode 71 at the overlapping position with the base 71b by way of the corresponding contact hole 66 that penetrates through the gate insulating film 57 and the protective insulating film 59. The comb-too-like parts 72a of the common electrode 72 are slightly shortened compared with the first embodiment so as not to overlap with the connecting part 54.

The connecting parts 54 are formed simultaneously with the formation of the light-shielding electrodes 53 on the surface of the glass plate 11a. In other words, the light-shielding electrodes 53 and the connecting parts 54 are formed on the surface of the glass plate 11a by patterning the same metal film (e.g. a Cr film).

As explained above, with the LCD device according to the third embodiment, the two light-shielding electrodes 53 provided in each pixel region P are electrically connected to the base 71b of the corresponding pixel electrode 71 and therefore, the electric potential of the light-shielding electrodes 53 is always equal to that of the pixel electrode 71. As explained for the LCD device of the above-described first embodiment, the electric potentials of the electrically floating light-shielding electrodes 53 are close to the electric potential of the corresponding pixel electrode 71. Thus, almost the same action or function as that of the first embodiment is generated in the structure of the LCD device of the third embodiment also. Accordingly, it is apparent that the LCD device of the third embodiment has the same advantages as those of the first embodiment.

In addition, the two light-shielding electrodes 53 provided in each pixel region P are electrically connected to each other with the belt-shaped connecting part 54 and at the same time, these electrodes 53 are electrically connected to the corresponding pixel electrode 71 by way of the corresponding contact hole 66 in the third embodiment. However, the invention is not limited to this. Each of the two light-shielding electrodes 53 provided in each pixel region P may be directly connected to the corresponding pixel electrode 71 by way of the corresponding contact hole 66 without using the connecting part 54. It is sufficient for the third embodiment of the invention that the light-shielding electrodes 53 are electrically connected to the corresponding pixel electrode 71 at any position or positions in each pixel region P.

Variations

The above-described first to third exemplary embodiments are preferred embodied examples of the present invention. Therefore, it is needless to say that the present invention is not limited to these embodiments and that any other modification is applicable to these embodiments.

For example, the light-shielding electrode 53 is belt-shaped in the above-described first to third embodiments of the invention. However, it is sufficient for the invention that the light-shielding electrode 53 is extended along the corresponding drain bus line 56 and is placed near the same bus line 56. The light-shielding electrode 53 may have any other shape or pattern than the belt-like one.

While the preferred forms of the present invention have been described, it is to be understood that modifications will be apparent to those skilled in the art without departing from the spirit of the invention. The scope of the present invention, therefore, is to be determined solely by the following claims.

What is claimed is:

1. A lateral electric field type active-matrix addressing liquid crystal display device comprising:
   a first substrate including gate bus lines, common bus lines parallel to the gate bus lines, and drain bus lines intersected with the gate bus lines and the common bus lines;
   a second substrate held to be opposite to the first substrate at a predetermined gap;
   a liquid crystal layer placed between the first substrate and the second substrate;
   pixel regions defined by the gate bus lines and the drain bus lines to be arranged in a matrix array; and
   each of the pixel regions including a switching element, a pixel electrode electrically connected to the switching element, and a common electrode electrically connected to a corresponding one of the common bus lines;
   wherein in each of the pixel regions, at least one light-shielding layer is formed to extend along the drain bus lines that define the pixel electrode near the same drain bus lines;
   the at least one light-shielding layer is electrically isolated and is overlapped with at least one part of the pixel electrode corresponding to the pixel region in such a way that an insulating film intervenes between the at least one light-shielding layer and the at least one part, wherein the at least one part is extended along the drain bus lines in their vicinities;
   liquid crystal molecules confined in the liquid crystal layer are rotated in planes approximately parallel to the first substrate, thereby displaying images; and
   the electrically isolated light-shielding layer is electrically separated from the gate bus lines, the drain bus lines, the common bus lines, and the switching elements, and is arranged so that, in an operating state, an electric potential of the light-shielding layer is close to an electric potential of the corresponding pixel electrode so that a coupling capacitance between the drain bus lines and the light-shielding layer is very small.

2. The device according to claim 1, wherein the at least one light-shielding layer is placed on a different layer from that for the drain bus lines in such a way that an insulating film intervenes between them.

3. The device according to claim 1, wherein the at least one part of the pixel electrode corresponding to the pixel region is comb-tooth-shaped; and
   the at least one light-shielding layer is belt-shaped to extend along the drain bus lines.

4. The device according to claim 1, wherein the pixel electrode corresponding to the pixel region comprises comb-tooth-shaped parts extending along the drain bus lines;
   two of the comb-tooth-shaped parts of the pixel electrode located at outer positions are used as the at least one part of the pixel electrode extending along the two drain bus lines that define the pixel electrode in the vicinities of the same drain bus lines; and the two light-shielding layers are belt-shaped to extend along the two drain bus lines that define the pixel electrode, respectively.

5. The device according to claim 1, wherein the drain bus lines are bent to have approximately V-like shapes in accordance with the respective pixel regions; and the pixel electrodes and the common electrodes are bent to have approximately V-like shapes corresponding to the drain bus lines.

6. The device according to claim 1, wherein the pixel electrodes are placed on a different layer from that for the drain bus lines in such a way that an insulating film intervenes between them.

7. The device according to claim 1, wherein the common electrodes are placed on a same layer as the pixel electrodes.

8. The device according to claim 1, wherein the pixel electrodes and/or the common electrodes are made of a transparent conductive material or materials.

* * * * *